(12) United States Patent
Buchmann

(10) Patent No.: US 12,045,250 B2
(45) Date of Patent: Jul. 23, 2024

(54) METADATA INTEGRATION

(71) Applicant: SAP SE, Walldorf (DE)

(72) Inventor: Daniel Buchmann, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/487,527

(22) Filed: Sep. 28, 2021

(65) Prior Publication Data

US 2022/0407924 A1 Dec. 22, 2022

Related U.S. Application Data

(60) Provisional application No. 63/211,944, filed on Jun. 17, 2021.

(51) Int. Cl.
| | |
|---|---|
| *G06F 16/25* | (2019.01) |
| *G06F 9/54* | (2006.01) |
| *G06F 16/21* | (2019.01) |
| *G06F 16/2453* | (2019.01) |
| *G06F 16/2457* | (2019.01) |

(Continued)

(52) U.S. Cl.
CPC ............ *G06F 16/254* (2019.01); *G06F 9/547* (2013.01); *G06F 16/211* (2019.01); *G06F 16/24534* (2019.01); *G06F 16/24573* (2019.01); *G06F 16/252* (2019.01); *G06F 16/27* (2019.01); *G06F 16/288* (2019.01); *G06F 16/289* (2019.01); *G06F 16/907* (2019.01); *H04L 67/561* (2022.05); *H04L 67/565* (2022.05)

(58) Field of Classification Search
CPC ...... G06F 16/254; G06F 9/547; G06F 16/211; G06F 16/24534; G06F 16/24573; G06F 16/252; G06F 16/27; G06F 16/288; G06F 16/289; G06F 16/907; G06F 9/541; H04L 67/561; H04L 67/565
USPC .......................................................... 709/246
See application file for complete search history.

(56) References Cited

U.S. PATENT DOCUMENTS 6,609,123 B1 * 8/2003 Cazemier .............. G06F 16/289
7,487,512 B2 2/2009 Brunswig et al.
(Continued)

OTHER PUBLICATIONS

U.S. Appl. No. 17/073,560, Schlarb et al., filed Oct. 19, 2020.
(Continued)

*Primary Examiner* — Wing F Chan
*Assistant Examiner* — John Fan
(74) *Attorney, Agent, or Firm* — Fish & Richardson P.C.

(57) ABSTRACT

The present disclosure relates to computer-implemented methods, software, and systems for exchanging metadata between applications. One example method includes providing a metadata service defining a service metadata model for exposing metadata of data objects defined at one or more applications. A connection to a data source associated with a first application is established from a separate application to acquire the metadata from the data source for one or more data objects related to the first application. In response to establishing the connection, a view of content from the data source is provided that includes a list of entities from the service metadata model. A query defined based on the list of entities is received for acquiring metadata associated with the one or more identified entities. The query is evaluated at a backend of the first application and the metadata for the identified entities from the data source is provided.

14 Claims, 10 Drawing Sheets

(51) Int. Cl.
- *G06F 16/27* (2019.01)
- *G06F 16/28* (2019.01)
- *G06F 16/907* (2019.01)
- *H04L 67/561* (2022.01)
- *H04L 67/565* (2022.01)

(56) References Cited

U.S. PATENT DOCUMENTS

| | | |
|---|---|---|
| 7,487,513 B1 | 2/2009 | Savchenko et al. |
| 7,496,624 B2 | 2/2009 | Falter et al. |
| 7,606,818 B2 | 10/2009 | Buchmann et al. |
| 7,617,480 B2 | 11/2009 | Falter et al. |
| 7,620,934 B2 | 11/2009 | Falter et al. |
| 7,689,646 B2 | 3/2010 | Buchmann et al. |
| 7,694,140 B1 | 4/2010 | Savchenko et al. |
| 7,739,387 B2 | 6/2010 | Eberlein et al. |
| 7,756,870 B2 | 7/2010 | Buchmann et al. |
| 7,783,717 B1 | 8/2010 | Savchenko et al. |
| 7,822,826 B1 | 10/2010 | Savchenko et al. |
| 7,853,616 B2 | 12/2010 | Buchmann et al. |
| 7,971,209 B2 | 6/2011 | Eberlein et al. |
| 8,010,376 B2 | 8/2011 | Buchmann et al. |
| 8,027,963 B2 | 9/2011 | Dentzer et al. |
| 8,099,431 B2 | 1/2012 | Buchmann et al. |
| 8,131,694 B2 | 3/2012 | Bender et al. |
| 8,209,281 B2 | 6/2012 | Dentzer |
| 8,209,302 B2 | 6/2012 | Dentzer |
| 8,352,478 B2 | 1/2013 | Buchmann et al. |
| 8,458,189 B1 | 6/2013 | Ludwig et al. |
| 8,572,286 B2 | 10/2013 | Buchmann et al. |
| 8,606,723 B2 | 12/2013 | Seubert et al. |
| 8,655,756 B2 | 2/2014 | Seubert et al. |
| 8,694,397 B2 | 4/2014 | Seubert et al. |
| 8,756,273 B2 | 6/2014 | Buchmann et al. |
| 8,862,613 B2 | 10/2014 | Stein et al. |
| 8,863,097 B2 | 10/2014 | Thimmel et al. |
| 8,892,454 B2 | 11/2014 | Rabetge et al. |
| 8,943,176 B2 | 1/2015 | Buchmann et al. |
| 9,176,801 B2 | 3/2015 | Baeuerle et al. |
| 9,009,354 B2 | 4/2015 | Schmitt et al. |
| 9,021,019 B2 | 4/2015 | Krannich et al. |
| 9,031,976 B2 | 5/2015 | Seufert et al. |
| 9,148,488 B2 | 9/2015 | Rabetge et al. |
| 9,299,049 B2 | 3/2016 | Stallman et al. |
| 9,354,948 B2 | 5/2016 | Baeuerle et al. |
| 9,361,407 B2 | 6/2016 | Hutzel et al. |
| 9,430,523 B2 | 8/2016 | Falter et al. |
| 9,442,977 B2 | 9/2016 | Falter et al. |
| 9,575,819 B2 | 2/2017 | Baeuerle et al. |
| 9,619,552 B2 | 4/2017 | Falter et al. |
| 9,639,572 B2 | 5/2017 | Hutzel et al. |
| 9,697,042 B2 | 7/2017 | Stein et al. |
| 9,703,833 B2 | 7/2017 | Buchmann et al. |
| 9,996,594 B2 | 6/2018 | Richter et al. |
| 10,133,826 B2 | 11/2018 | Mehta et al. |
| 10,176,230 B2 | 1/2019 | Buchmann |
| 10,255,239 B2 | 4/2019 | Michels et al. |
| 10,275,495 B2 | 4/2019 | Buchmann et al. |
| 10,289,622 B2 | 5/2019 | Buchmann |
| 10,365,896 B2 | 7/2019 | Finke et al. |
| 10,366,089 B2 | 7/2019 | Buchmann |
| 10,706,047 B2 | 7/2020 | Buchmann |
| 10,713,246 B2 | 7/2020 | Schukovets et al. |
| 10,838,781 B1* | 11/2020 | Banerjee ............... G06F 16/907 |
| 2005/0022156 A1 | 1/2005 | Schwan et al. |
| 2007/0156427 A1 | 7/2007 | Dentzer et al. |
| 2007/0162415 A1 | 7/2007 | Dentzer et al. |
| 2007/0162468 A1 | 7/2007 | Dentzer et al. |
| 2007/0276920 A1 | 11/2007 | Buchmann et al. |
| 2009/0049509 A1 | 2/2009 | Chan et al. |
| 2010/0332277 A1 | 12/2010 | Dentzer et al. |
| 2011/0153582 A1 | 6/2011 | Buchmann et al. |
| 2011/0295793 A1 | 12/2011 | Venkatasubramanian et al. |
| 2012/0254094 A1 | 10/2012 | Flinn et al. |
| 2012/0296929 A1 | 11/2012 | Hossain et al. |
| 2013/0166550 A1 | 6/2013 | Buchmann et al. |
| 2013/0166563 A1 | 6/2013 | Mueller et al. |
| 2014/0164449 A1 | 6/2014 | Kim et al. |
| 2014/0279839 A1 | 9/2014 | Balzar et al. |
| 2014/0310231 A1* | 10/2014 | Sampathkumaran ....... G06F 16/254 707/602 |
| 2015/0293947 A1 | 10/2015 | Bhagavan et al. |
| 2016/0092476 A1* | 3/2016 | Stojanovic .......... G06F 16/2219 707/805 |
| 2017/0103093 A1 | 4/2017 | Chandra et al. |
| 2017/0185684 A1* | 6/2017 | Tsirulnik ............. G06F 16/9535 |
| 2018/0144067 A1 | 5/2018 | Chatelain et al. |
| 2018/0174161 A1 | 6/2018 | You et al. |
| 2018/0285390 A1 | 10/2018 | Mayer et al. |
| 2019/0109822 A1* | 4/2019 | Clark .................... H04L 63/145 |
| 2020/0177476 A1 | 6/2020 | Agarwal et al. |
| 2020/0183927 A1 | 6/2020 | Buchmann |
| 2020/0296169 A1* | 9/2020 | Jeuk ..................... H04L 67/141 |
| 2020/0311078 A1 | 10/2020 | Qiao et al. |
| 2021/0026817 A1 | 1/2021 | Eswaran et al. |
| 2021/0049183 A1 | 2/2021 | Ramanathan et al. |
| 2021/0084108 A1 | 3/2021 | Lu et al. |
| 2021/0216510 A1 | 7/2021 | Falter et al. |

OTHER PUBLICATIONS

U.S. Appl. No. 17/487,567, Buchmann., filed Sep. 28, 2021
U.S. Appl. No. 17/487,608, Buchmann et al., filed Sep. 28, 2021.
U.S. Appl. No. 17/487,668, Buchmann et al., filed Sep. 28, 2021.
Github.wdf.sap.corp [online], "orca/data_mart_management_service" Jan. 2021, [retrieved on May 24, 2021], retrieved from: URL <https://github.wdf.sap.corp/orca/data_mart_management_service/tree/master/service/docs/csnExposureService>, 6 pages.
Pages.github.tools.sap [online], ORD Document Interface Jun. 2021, [retrieved on Jun. 18, 2021], retrieved from : URL <https://pages.github.tools.sap/1522722/open-resource-discovery-specification/#/v1/generated/Document?id-entity-type-mapping>, 59 pages.
Wiki.wdf.sap.corp [online], "CSN—Service Implementation—PI Core Application Services—Wiki@SAP" May 2021, [retrieved on May 24, 2021], retrieved from : URL <https://wiki.wdf.sap.corp/wiki/display/ApplServ/CSN+-+Service+Implementation>, 7 pages.
Wiki.wdf.sap.corp [online], "Resolution Framework—ABAP for HANA—Wiki@SAP" Jun. 2020 [retrieved on May 24, 2021], retrieved from : URL <https://wiki.wdf.sap.corp/wiki/display/A4H/Resolution+Framework>, 4 pages.
Final Office Action in U.S. Appl. No. 17/487,668, dated Oct. 13, 2023, 21 pages.
Non-Final Office Action in U.S. Appl. No. 17/487,567, dated Jul. 27, 2023, 22 pages.
Final Office Action in U.S. Appl. No. 17/487,567, dated Feb. 9, 2023, 23 pages.
Non-Final Office Action in U.S. Appl. No. 17/487,567, dated Oct. 20, 2022, 23 pages.
Non-Final Office Action in U.S. Appl. No. 17/487,608, dated Sep. 21, 2022, 15 pages.
Non-Final Office Action in U.S. Appl. No. 17/487,668, dated Mar. 31, 2023, 17 pages.
Final Office Action in U.S. Appl. No. 17/487,567, mailed on Dec. 14, 2023, 24 pages.
Non-Final Office Action in U.S. Appl. No. 17/487,668, mailed on Jan. 29, 2024, 24 pages.

* cited by examiner

METADATA INTEGRATION

CLAIM OF PRIORITY

This application claims priority under 35 USC § 119(e) to U.S. Provisional Application Ser. No. 63/211,944, filed on Jun. 17, 2021, entitled "METADATA INTEGRATION"; the entire contents of which are hereby incorporated by reference.

CROSS-REFERENCE TO RELATED APPLICATIONS

This application is related to co-pending U.S. application Ser. No. 17/487,567, filed on Sep. 28, 2021; entitled: "METADATA INTEGRATION BASED ON SCOPE FUNCTION DEFINITION"; and also related to co-pending U.S. application Ser. No. 17/487,608, filed on Sep. 28, 2021; entitled: "IMPORTING DATA OBJECTS METADATA BASED ON APPLICATION INTERFACE TO SERVICE ENTITY MAPPINGS"; and also related to co-pending U.S. application Ser. No. 17/487,668, filed on Sep. 28, 2021; entitled: "AUTOMATIC CONFIGURATION OF DATA INVOCATION FROM ONE OR MORE SOURCES BASED ON METADATA MAPPINGS"; the entire contents of each are hereby incorporated by reference.

TECHNICAL FIELD

The present disclosure relates to computer-implemented methods, software, and systems for data processing in cross-application scenarios.

BACKGROUND

Applications and application systems can generate and store data and/or data objects together with underlying metadata. Data objects can be defined to include multiple attributes (or properties) that can be associated with underlying metadata, different dimensions and/or measures, and access rights, among other examples. Data objects can be defined according to a data model and can be persisted at a database or storage layer. In some cases, applications interact with each other and exchange data, for example, data objects. When data objects are transferred from one application to another, metadata for the data objects may also be invoked and transferred. In some instances, the metadata can be used in the context of different application scenarios, for example, in a cross-analytics scenario.

SUMMARY

Implementations of the present disclosure are generally directed to computer-implemented systems for exchanging metadata between applications.

In a first aspect, one example method may include operations such as providing a metadata service defining a service metadata model for exposing metadata of data objects defined at one or more applications; in response to receiving a request for importing metadata from a first application of the one or more applications to a separate application, establishing a connection to a data source associated with the first application to acquire the metadata from the data source for one or more data objects related to the first application; in response to establishing the connection, providing a view of content from the data source, wherein the view includes a list of entities from the service metadata model associated with the one or more data objects of the first application; receiving a query defined based on the list of entities provided at the view of the content from the data source to acquire metadata associated with the one or more identified entities; and in response to evaluating the received query at a backend of the first application, providing the metadata for the identified entities from the data source associated with the first application to the separate application.

In some instances, in response to receiving the query, one or more identifiers for the entities are identified and provided to the backend of the first application to query the data at the data source.

In some instances, the service metadata model comprises scopes defined for the entities, wherein a set of scopes are defined for the list of entities associated with data objects of the first application.

In some instances, the list of entities from the service metadata model that are associated with the one or more data objects of the first application are determined based on invoking a scope function defined at the metadata service, where the scope function determines which types of entities are related to each of the entities from the one or more identified entities from the list.

In some instances, the one or more applications store metadata related to corresponding sets of data objects, wherein metadata related to different sets of data objects is stored according to different metadata models.

In some instances, the method can include transforming metadata of the data objects from the one or more applications into metadata that is in a predefined notation for representation of metadata according to the service metadata model predefined by the metadata service.

In some instances, the service metadata model is defined in JSON format.

Other implementations of this first aspect include corresponding systems, apparatus, and computer programs, configured to perform the actions of the methods, encoded on computer storage devices.

In a second aspect, an example method may include, one example method may include operations such as in response to establishing a connection to a data source associated with a first application, providing, by a metadata integration service associated with the first application, a view of content from the data source, wherein the metadata integration service defines a service metadata model including entities defined for data objects of the first application, and wherein the entities of the service metadata model are each associated with different scopes defining dependencies between entities, wherein the view includes at least one entity associated with data objects of the first application; receiving a query to acquire metadata associated with one or more data objects of the first application, the query defined based on the at least one entity identified at the view; in response to evaluating the received query, invoking a scope function to determine relevant entities for the query based on dependency rules defining scopes for entities at the scope function; and providing the metadata for the relevant entities for the query from the data source associated with the first application to a data warehouse application.

In some instances, the scope function is invoked for execution at a backend of the first application.

In some instances, the scope function is invoked for execution at the metadata service, wherein logic of the scope function is implemented at the metadata service based on input logic from the first application.

In some instances, the metadata integration service is implemented to define the service metadata model for exposing metadata of data objects defined at the first application. In some instances, the metadata integration service can receive a request from an import user interface at the data warehouse application for importing metadata at the data warehouse application, wherein the metadata is for one or more data objects stored by the first application. The connection from the metadata integration service to the data source is received to acquire the metadata from the data source for the one or more data objects.

In some instances, the data warehouse application is a data warehouse cloud platform.

In some instances, in response to receiving the query, one or more identifiers for the entities are identified and provided to a backend of the first application to query the data source.

In some instances, the metadata service exposes metadata according to a service structure including entities and scopes defined for the entities, wherein the entities are annotated to provide contextual description of respective data objects associated with the entities.

Other implementations of this second aspect include corresponding systems, apparatus, and computer programs, configured to perform the actions of the methods, encoded on computer storage devices.

In a third aspect, one example method may include operations such as obtaining, at a data warehouse application, metadata for relevant entities in response to a query defined for querying metadata from a metadata source associated with a source application; in response to obtaining the metadata for the relevant entities, querying a service at the source application to identify a set of programming interfaces associated with the relevant entities for acquiring data objects corresponding to the obtained metadata from the source application; and generating instructions to be used to configure the database associated with the data warehouse application to acquire a data object from the data objects based on executing a call to a corresponding programming interface from the identified set of programming interfaces; and providing the generated instructions to the database to configure the database to automatically execute the call to acquire the data object from the source application.

In some instances, the service at the source application determines the set of programming interfaces based on predefined mapping relationships between metadata entities and programming interfaces defined at the source application.

In some instances, the query for the metadata from the metadata source is associated with a metadata entity, and wherein the obtained metadata includes metadata for the identified metadata entity and metadata for related entities that are identified as related based on a scope function.

In some instances, the scope function is implemented and executed at the source application.

In some instances, querying the service at the source application includes querying a mapping storage at the source application that defines mappings between metadata entities and sections of programming interfaces.

In some instances, a mapping storage including mappings between a programming interface and one or more metadata entities defined at a metadata model of a metadata exposure service can be provided. In response to receiving the query for metadata at the metadata exposure service, the metadata for the relevant entities can be provided in response to the query to the data warehouse application. In some instances, the service is queried at the source application in response to the obtained metadata is executing the query based on evaluating the mappings stored at the mapping storage.

In some instances, the data warehouse application accumulates metadata for entities from a set of source applications based on a common metadata exposure service that defines a structure of metadata entities. The data warehouse application generates a set of configurations synchronized for acquiring data from the set of source applications to configure automatic execution of data gathering at the data warehouse application.

Other implementations of this third aspect include corresponding systems, apparatus, and computer programs, configured to perform the actions of the methods, encoded on computer storage devices.

In a fourth aspect, an example method may include: one example method may include operations such as: receiving, at a database associated with a data warehouse application, a request to generate a configuration to acquire data objects based on executing calls to corresponding programming interfaces provided by a source application, wherein the programming interfaces are identified in the received instructions and are associated with acquiring the data objects associated with metadata entities defined at the database; in response to the received instructions, configuring the database to automatically execute one or more calls to acquire relevant data for a metadata entity defined at the database, wherein the metadata entity is associated with a section of a first programming interface; and invoking the first programming interface at the source application, wherein invoking the first programming interface results in acquiring the relevant data.

In some instances, in response to obtaining identifiers defined for metadata entities, a service at the source application is queried by a data warehouse application to identify a set of programming interfaces associated with the metadata entities for acquiring data objects corresponding to the obtained metadata. The instructions can be received at the database are generated at the data warehouse application based on querying the service to identify the set of programming interfaces.

In some instances, the programming interfaces identified as corresponding to the data objects can be based on the received request are determined based on predetermined mapping logic between programming interfaces and metadata entities at the source application.

In some instances, the data warehouse application is a data warehouse cloud platform that accumulates metadata for entities from a set of source applications based on a common metadata exposure service that defines a structure of metadata entities.

In some instances, the database of the data warehouse application is configured to automatically acquire data from a set of source application based on deployed data models at the database. The deployed data models can be based on metadata and mappings between the metadata and corresponding programing interfaces at the set of source application.

In some instances, a metadata model can be deployed based on acquired metadata and mappings between entities defined at the metadata and corresponding programming interfaces at one or more source applications including the source application.

In some instances, the acquired data includes data for data objects associated with the metadata entity and with other metadata entities identified as associated to the metadata entity based on invoking a scope function defining dependencies between entities at the source application.

In some instances, the programming interfaces are application programming interfaces.

Other implementations of this fourth aspect include corresponding systems, apparatus, and computer programs, configured to perform the actions of the methods, encoded on computer storage devices.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
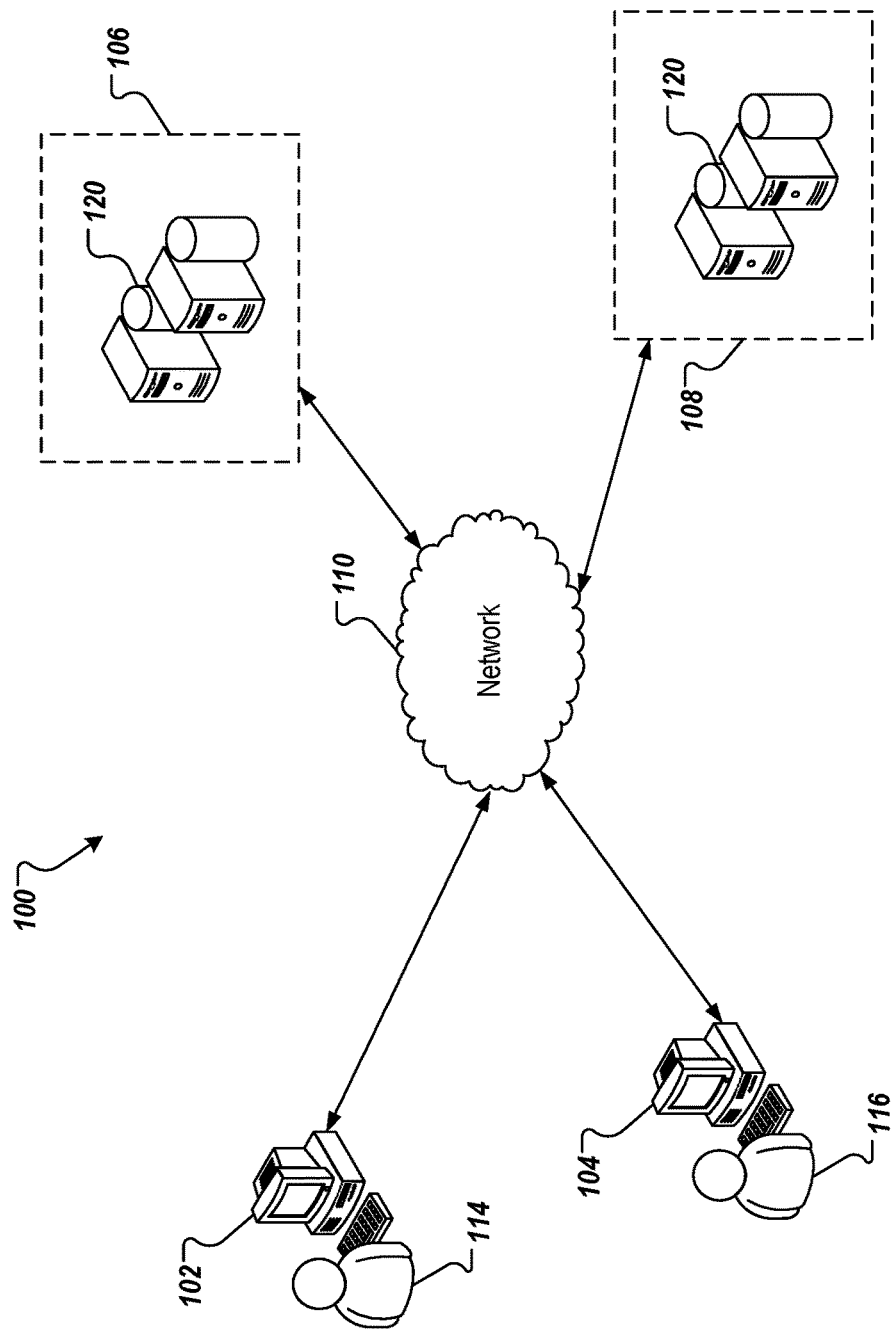
FIG. 1 depicts an example system that can execute implementations of the present disclosure.

The present disclosure describes various tools and techniques for metadata integration between applications and acquisition of data based on imported metadata.

In some instances, when data and/or data objects are transferred between applications and/or application systems, the underlying metadata associated with the data and/or data objects may also need to be transferred. Importing of data and metadata can be executed in the context of different application scenarios, for example, in a cross-application analytics scenario. In some instances, data objects defining entities of an application (e.g., business objects) can be defined in association with data access and application logic. In some instances, a data object can be defined to include multiple attributes (or properties) that can be associated with underlying metadata, different dimensions and/or measures, and access rights, among others. Data objects can be defined according to a data model, where data for the data objects can be persisted at a database or storage layer of an application.

In some instances, storage of data objects at a database can be organized according to a metadata model of database organizational structure for use in a data warehouse or a business intelligence application. For example, a star schema can be used as an organizational structure for organizing storage of data objects of an application. The star schema can define a large fact table to store transactional or measurement data, and separate metadata tables that store attributes about the data (e.g., dimensions, data types, measurements, and aggregations, among others).

For example, a business object can define a purchase order, a product item, a user role (e.g., a manager, an employee, a customer, or a partner, among others), a sales order, a department/unit, and other suitable items or objects. For example, a purchase order can include multiple attributes for different properties of a purchase, such as purchase data, time, amount, items, and others. In that example, a purchase order object can store data for different properties of an executed purchase. The attributes of a data object can be associated with underlying metadata.

In some instances, applications can communicate in different application scenarios where data from one (first) application can be transferred to another (second) application, for example, to perform data processing tasks on the data. Data transfer can include heavy processing operations, for example, when it requires large volumes of data to be transferred. Further, data transfer can be a time consuming operation due to data processing time for accessing and providing the data on a database level. In some instances, the second application may require just a portion of the data of the first application, but querying of the data may not be available, or it may be associated with a lot of computing resources and be time consuming.

In some instances, if metadata is transferred between the first application (or more applications) to the second application, such metadata can be used for the data processing. For example, if metadata for the data (e.g., data objects from the first application) is available to the second application, the second application can use the metadata to 1) define queries for the data at the first application, to 2) manage data organization at the second application, and to 3) identify relevant data and metadata that may be needed or desired to be imported (e.g., scope of data relevant for a search result), as well as other suitable utilizations of the metadata. For example, processing of data can be more efficiently performed when the processing is based on underlying metadata defined for the related data objects. Therefore, by transferring metadata, the data can be accessed and/or processed in a more accurate and efficient manner.

In some instances, metadata can be replicated from a first application into a second application, and can be used by the second application to invoke data from the first application that stores the associated data. In another instance, the metadata can be accessed at runtime at the database level of the first application, and data processing can then be executed. In some instances, if metadata associated with data at the first application is transferred (or replicated) into another application, the data processing can be executed with improved performance, at least for the fetching and storing of the metadata. When metadata is invoked at runtime, loading and population of data persistency storages can be time-consuming tasks that delay access to the metadata.

In some instances, metadata can be imported from a first application or system (e.g., a system part of a corporate network of systems such as a human resource system, a booking application, and other examples) into another system (e.g., a related system or a data warehouse application).

In some instances, based on imported metadata, metadata models for the data can be determined and then used as templates for further use. For example, a template can be defined as a copy of or an adjusted version of a model. In some instances, such templates can be adapted and replicated based on user requirements and needs. In some more instances, based on the imported metadata, a directory can be defined (or built) to integrate data from different sources that have different models that can be combined.

In some instances, if metadata is imported from a first application to a second application, a meaningful search query can be constructed at the second application, where that search query is sent to a search service at the first application to execute a search on an application layer of the first application. By generating the search query based on the imported metadata and sending it to the search service, the search operation is executed at lower costs compared to an alternative where client-level integration is performed between the systems to execute searching.

In some cases, metadata for given data in a first application can be changed, which can include a different interpretation of the data (e.g., change of the type of the data). This new interpretation may be in conflict with existing models and settings that can be defined at a second application based on invoked metadata prior to the change. Replicating metadata can be used to define versions of local models at the second application that can be relied upon to interpret the data without running into unexpected failures.

In some instances, if metadata is transferred (or imported) from a first application to a second application, operations (e.g., queries, building of views of the data at the first application, etc.) executed by the second application can be performed as if the metadata is locally created at the second application. In cases where metadata is accessed remotely (i.e., as an alternative to metadata transferring), repository refactoring might be used to support the remote source accessing. Further, in those cases, metadata might be managed into single lists with local content at the second application, which may be associated with managing naming or other conflicts.

In some instances, a metadata integration service can be implemented to support integration of metadata (e.g., of data stored at a first application) into a second application. In some instances, such metadata integration service can facilitate accessing and processing requests sent from the second application and directed to data at the first application. Requests for data at the first application can be created at the second application based on imported metadata as obtained by the metadata integration service. In some instances, the metadata service can be implemented to support transferring of metadata in a transport format for compact representation of metadata models, such as a Core Data Services (CDS) Schema Notation (CSN) metadata format.

In some instances, a metadata integration service can be implemented independently and outside of an application or system to invoke data from a data source and transfer it to a destination entity (e.g., application, database, system, repository, storage, etc.). In some instance, the metadata integration service can provide tools to connect to a source application, acquire information from the source application, and expose metadata for the data of the source application. In those cases, such exposed metadata may be used by another application consuming the services of the metadata integration service.

In some other instances, the metadata integration service can be integrated into an application and/or system that can be a model-driven application and/or system. For example, a data warehouse can integrate a client import agent that can acquire metadata from one or more metadata integration services that can be implemented at one or more applications (e.g., a first application and/or another application that can serve as a data source that provides data to the data warehouse) to acquire metadata for data of one or more applications. In that example, the data warehouse can consume the metadata provided by the metadata integration services at the one or more application. In some instances, the data warehouse can be another application or system that can accumulate and aggregate metadata from source applications. In some instances, based on acquired metadata from the one or more application, the data warehouse can define queries to invoke data from the one or more application, can define data models and/or structures to organize acquired data, and/or can enhance the acquired data by merging it with data invoked from further applications/systems or with self-generated (or acquired) data. In some instances, the data warehouse can generate queries and views based on acquired metadata from a first application that imports its metadata at the data warehouse through a metadata integration service as discussed above and in accordance with the implementations of the present disclosure.

In some instances, the data warehouse as a data consuming application can be implemented as an on-premise or as an on-demand application and/or platform. The data warehouse can provide further access to accumulated data from the one or more applications to further users. In some instances, the accumulated data can be presented in different forms, can be manipulated, can be transformed, or can be extended, or other data processing operations can be executed on the data acquired at the data warehouse.

In some instances, if multiple applications (data providers) integrate a metadata integration service that exposes metadata in a common metadata format, a data acquiring application (e.g., a data warehouse) can process data that is acquired from different sources that may store data in different formats and based on different technologies. For example, the metadata format for exposing the metadata from the data provider application can be predefined by the data acquiring application.

In some instances, a format for exposing metadata of a given application can be predefined (that is, so that the format is compatible with the applications exchanging data) and that format can be used as a basis for interpreting the associated data with the exposed metadata. The format can be uniform and metadata for data stored at applications of different technologies can be exported and later used at a common application. For example, metadata associated with data from two (or more) applications based on different implementation technologies and principles may be exposed through a metadata service into a common metadata format, where the common metadata format can be used by a third application that may consume data from either or all of the applications. In some instances, when metadata is exposed in a given format, the metadata can include annotations to define characteristics of the associated data. For example, the metadata can include status data, descriptions, types, subtypes, and groups, among other examples.

In some instances, the exposed metadata may include annotations that represent configurations for the application from which the metadata is exposed. For example, such configurations may include units of measurement (e.g., dimensions, conversions, etc.) and currencies (and/or exchange rates). In additional or alternative cases, the exposed metadata may include settings defined at the application. Such settings, for example, may be associated with the way of managing and storing data at the application. In some instances, metadata about settings can be evaluated to determine whether it is relevant for the exposure, and in some cases a central server or repository can be used to store information for some general settings, for example, currencies, exchange rates, and measurements, among other examples.

In some instances, a metadata integration service can define a transport format for the metadata from a first application to a second application, where such format may not include data about authorization models. In some cases, authorization models can be defined at a first application in form of SQL privileges, which may not include restrictions for accessing the data, and such authorization models may not be included as part of the exposed metadata. In some more cases, authorization models can be defined on application level and would not deployed on the database. In those cases, secure access of the data from a second application may be executed by communication requests from the second application and can be executed through a service on application level to get access to the data at the first application.

In some instances, based on instantiating a metadata integration service at one or more applications, metadata from the one or more applications can be exposed to an external application, where such metadata can be used for defining data requests from the external application to at least one of the one or more applications.

FIG. 1 depicts an example architecture 100 in accordance with implementations of the present disclosure. In the depicted example, the example architecture 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 include at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on virtual machines (VMs) hosted on cloud infrastructure. In some instances, one application and/or service can run as multiple application instances on multiple corresponding VMs, where each instance is running on a corresponding VM.

In some instances, the cloud environment 106 can host different applications that can store data related to data objects (e.g., business objects). In some instances, some of the applications hosted at the cloud environment 106 can implement a metadata integration service for exposing metadata for the data objects stored, where such exposed metadata can be imported at a data consuming application that can be hosted at the cloud environment 106 or externally. The data consuming application can import metadata from the applications and can use the metadata to define search queries and views for the data stored by the application. In some instances, based on generation of queries and views, data from the application can be invoked and processed more efficiently with less resource consumption. Further, by invoking and processing data from multiple application according to queries defined over a shared common metadata format, the data acquisition can be more performed more accurately and data integrity can be maintained.

Metadata Integration

Figure 2:
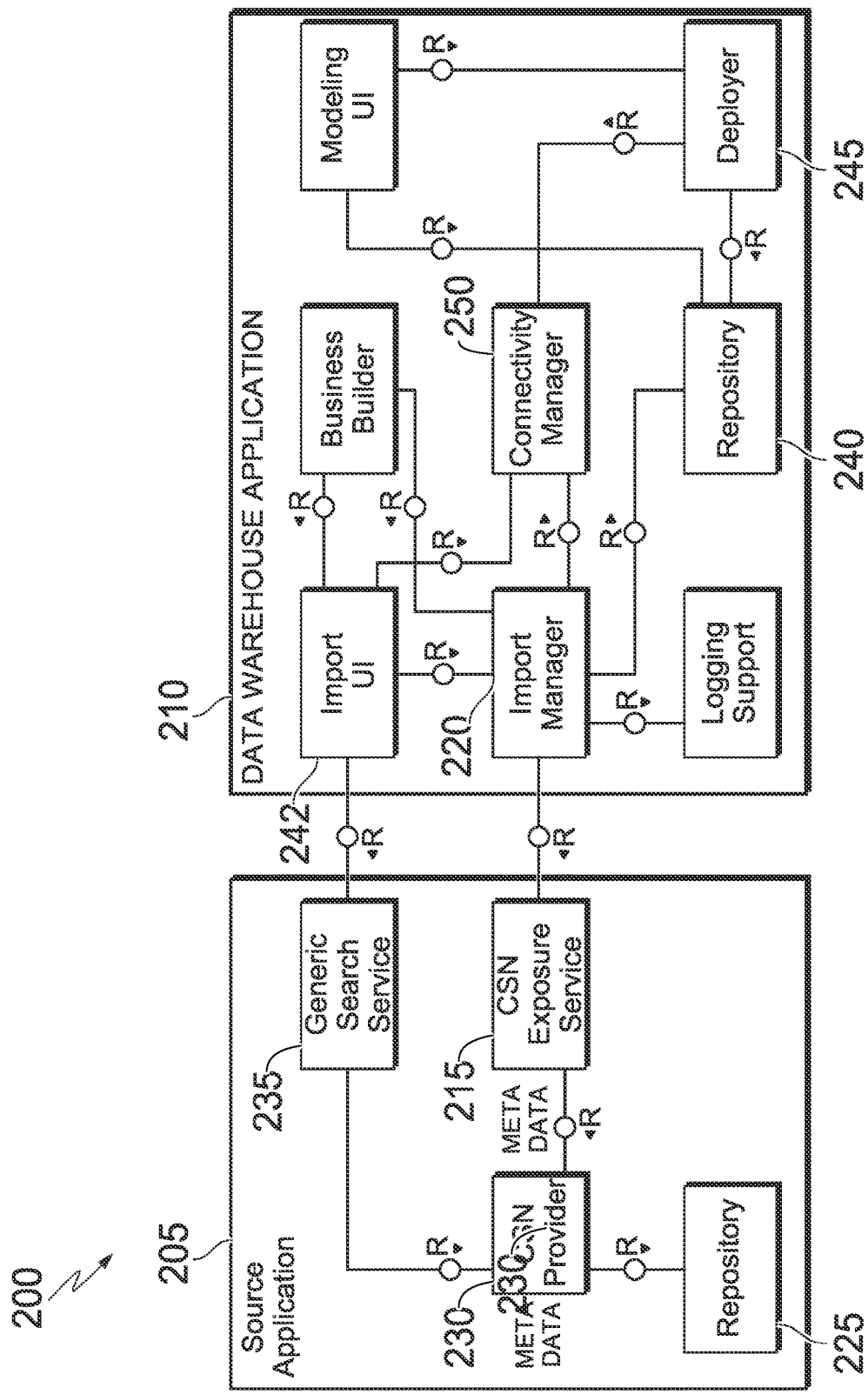
FIG. 2 depicts an example system that can execute exchange of metadata between applications in accordance with implementations of the present disclosure.

FIG. 2 depicts an example system 200 that can execute exchanges of metadata between applications in accordance with implementations of the present disclosure.

In some instances, the example system 200 includes multiple applications and components that interact to exchange metadata.

In some instances, a source application 205 is provided with a metadata exposure service 215 that exposes metadata associated with data objects of the source application to a data acquiring application, such as a data warehouse application 210. In some instances, the metadata exposure service 215 is defined to expose metadata of a predefined metadata format from a data source, such as the metadata provider 230. The metadata content may be associated with data objects of the source application that are stored at a repository 225. For example, the data objects can be business objects, e.g., purchase order, sales order, department manager role, user, product, among other examples.

In some instances, the data warehouse application 210 includes an import user interface (UI) 242 component that supports user interaction for receiving requests for importing metadata and initiating search calls to trigger import execution of metadata from the source application 205. The import UI 242 receives calls for searching and/or importing metadata that trigger an import manager 220 to execute searching and/or importing. The import UI 242 can send requests for searching to a generic search service 235 that can search metadata from the metadata provider 230. The import manager 220 can acquire data, such as metadata, from the metadata exposure service 210 and store the acquired metadata at a repository 240 at the data warehouse application 210. In some cases, calling the metadata exposure service 215 may require some data that can be taken from a connectivity manager 250 at the data warehouse application 210 to establish a connection with the source application 205 for importing metadata. In some instances, once metadata is imported through the import manager 220 at the data warehouse application 210, one or more models can be built on top of the imported content. In some instances, metadata models can be deployed at runtime of the data warehouse application 210 by providing them to a deployer service 245 to execute the models.

In some instances, importing metadata from the metadata exposure service 215 as requested by the import manager 220 at the data warehouse application 210 can be performed without providing notifications to end users until metadata is extracted and metadata models are deployed and running in a valid scope (e.g., all relevant information for executing the metadata model is captured from the source application 205). In those cases, the importing of metadata can be performed and, at runtime, the imported metadata can be available for consumption.

Figure 3:
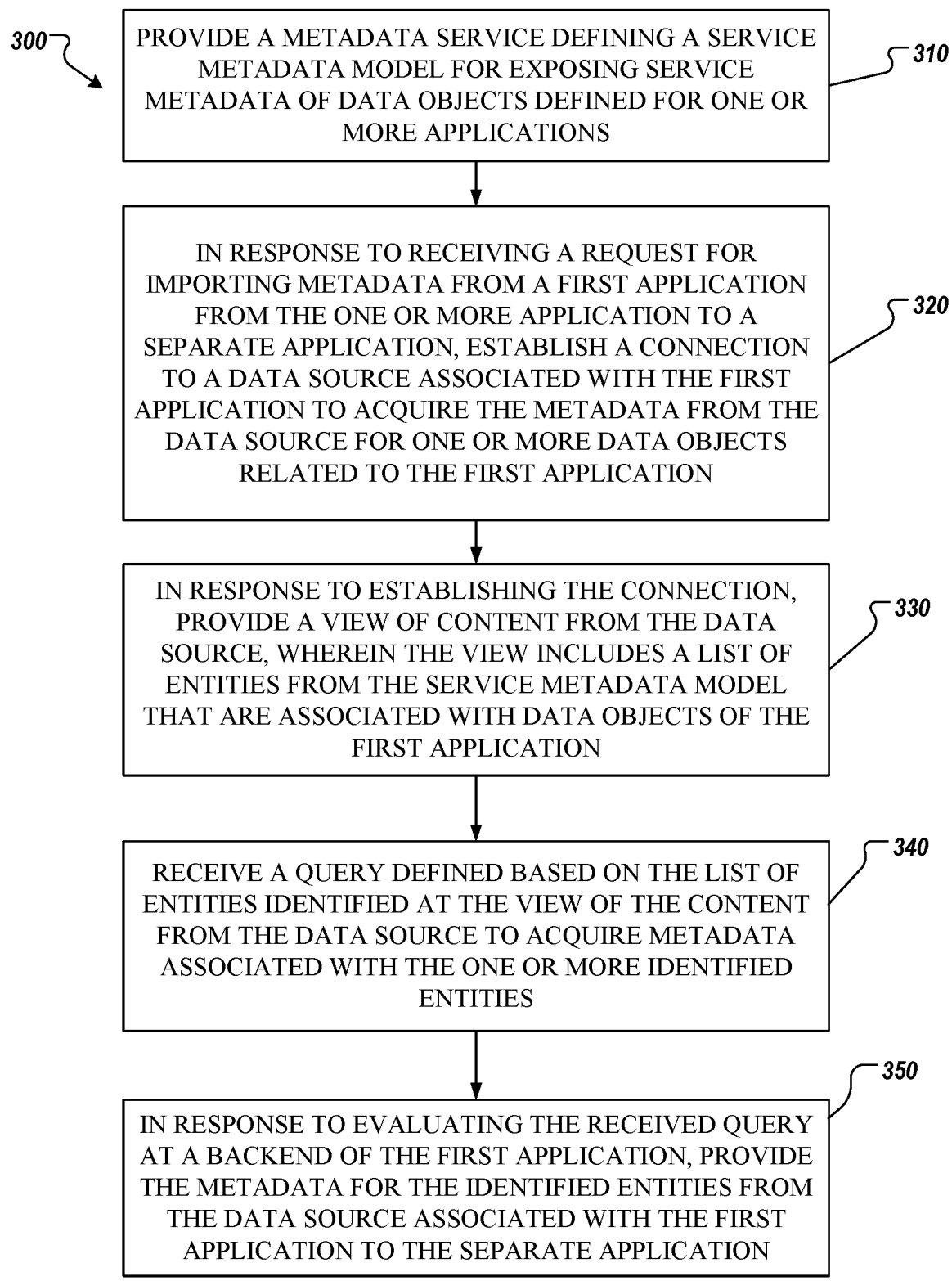
FIG. 3 is a flowchart for an example method for exchanging metadata between applications in accordance with implementations of the present disclosure.

FIG. 3 is a flowchart for an example method 300 for exchanging metadata between applications in accordance with implementations of the present disclosure.

In some instances, applications, services, or databases, among other entities that can be hosted in a cloud environment, may provide services for consumption within a cloud platform or outside of the cloud platform. Applications and services running on the cloud platform may execute logic that include processing received requests and providing resources or data, dispatching received requests to other entities, querying database entities, and/or accessing external resources to gather data or to request services, among other examples of implemented processing logic at running entities on the cloud platform. For example, an application may execute processes and access a database to provide services to end-users.

In some instances, applications can provide data to a data warehouse cloud application, where the data warehouse cloud can use the acquired data to perform data processing operations. To acquire data from one or more applications, the data warehouse cloud or another data consumer may first invoke metadata associated with the one or more applications to determine data that can be relevant for different data processing scenarios. In some instances, the one or more applications can store data in form of data objects (e.g., business objects) where metadata associated with the data objects can be converted in a predefined metadata format and exported to the data warehouse cloud application for defining data queries, for data manipulation and organization purposes, or for other purposes, at the data warehouse cloud application.

In some instances, an application can be communicatively coupled or can be integrated with a metadata integration service that can expose metadata for data objects of the application into a predefined metadata format, where such metadata can be consumed by another application to generate data manipulation tasks for the data objects of the application, to configure data invocation calls, to extract portions of the data, to filter and select portions of the data objects of the application, to define queries for data objects of the application, or the like. In some instances, the application can store metadata for the data objects in one metadata format, and may expose metadata for the data objects in a different, predefined metadata format. For example, the predefined metadata format can be CSN metadata format that defines an organizational structure of metadata for data objects.

In some instances, a predefined metadata format for exposing metadata by a metadata service can be used to provide metadata for data objects of one or more applications storing data for data objects, and can be defined to organize the metadata defined for the objects at the respective applications. In some instances, the metadata format can be defined to include entities that are annotated and labeled to provide information for the association of the entities with the metadata for the data objects as defined the first application. Further, the metadata format may include data for the types of the entities, such as a view, a table, a query, an object, among other examples.

Returning to the illustrated method 300 of FIG. 3, a metadata service defining a service metadata model for exposing metadata of data objects defined at one or more applications is provided at 310.

In some instances, the metadata service can be or include the metadata integration service discussed above, and can be implemented to acquire metadata for the data objects defined for one or more applications that are in a predefined format defining an organizational structure for the metadata and expose the metadata to an external application that can consume the metadata. In some instances, the external application can be a data acquisition application, such as a data warehouse application.

In some instances, requests can be received at an instance of the metadata service for exposing metadata of a given application from the one or more applications. In some instances, an instance of the metadata service can be instantiated as part of the given application, where each instance can expose metadata in a common metadata format. In some instances, the metadata service can be implemented as an external layer that connects to a data source at a given application and acquires metadata from the data source and provides it to requesting parties.

In some instances, the service metadata model comprises scopes defined for the entities. In some cases, a set of scopes can be defined for the list of entities associated with data objects of the first application. In some instances, one entity can be associated with one or more other entities that are not part of the defined list. For example, a purchase order data object can be associated with a product item that is a separate data object, where the separate data object is linked and identified at the purchase order data object. In the present example, the product item as a data object can include data that is relevant for the purchase order, such as a quantity of the product item, data of purchase of the product item, a price for the product item, a date of production, or expiration data, among other examples of metadata attributes defined for a purchase order data object.

In some instances, the one or more applications can store metadata related to corresponding sets of data objects according to a different metadata model, since the one or more applications can originally store metadata in another metadata format. The metadata originally stored for data objects at an application can correspond to the technology underlying the application. The metadata stored for those data objects can be converted into a predefined metadata format that corresponds to the service metadata model of the metadata service.

In some cases, an application can originally store the metadata for data object in the service metadata model. In those cases, based on the service metadata model, the metadata of the data objects from the application can be transformed or converted to metadata in a predefined notation for representation of models of data services as defined by the service metadata model of the metadata service. In some instances, the service metadata model can be defined in a JavaScript Object Notation (JSON) format, as well as other suitable formats.

In some instances, an application can provide metadata in a predefined metadata model to the metadata service that can expose the metadata for consumption by a separate external application. The metadata service can serve as an intermediary that can acquire metadata in a predefined format and can automatically transfer the metadata to separate application, for example to acquire metadata and later on to acquire data from the source application.

At 320, in response to receiving a request for importing metadata from a first application of the one or more application to a separate application, a connection is established between the metadata service and a data source associated with the first application to acquire the metadata from the data source for one or more data objects related to the first application. In some instances, the acquired metadata can be metadata of a defined metadata format for the metadata integration service. The acquired metadata can be generated in the defined metadata format at the first application based on the application specific metadata for data objects at the first application.

Figure 4:
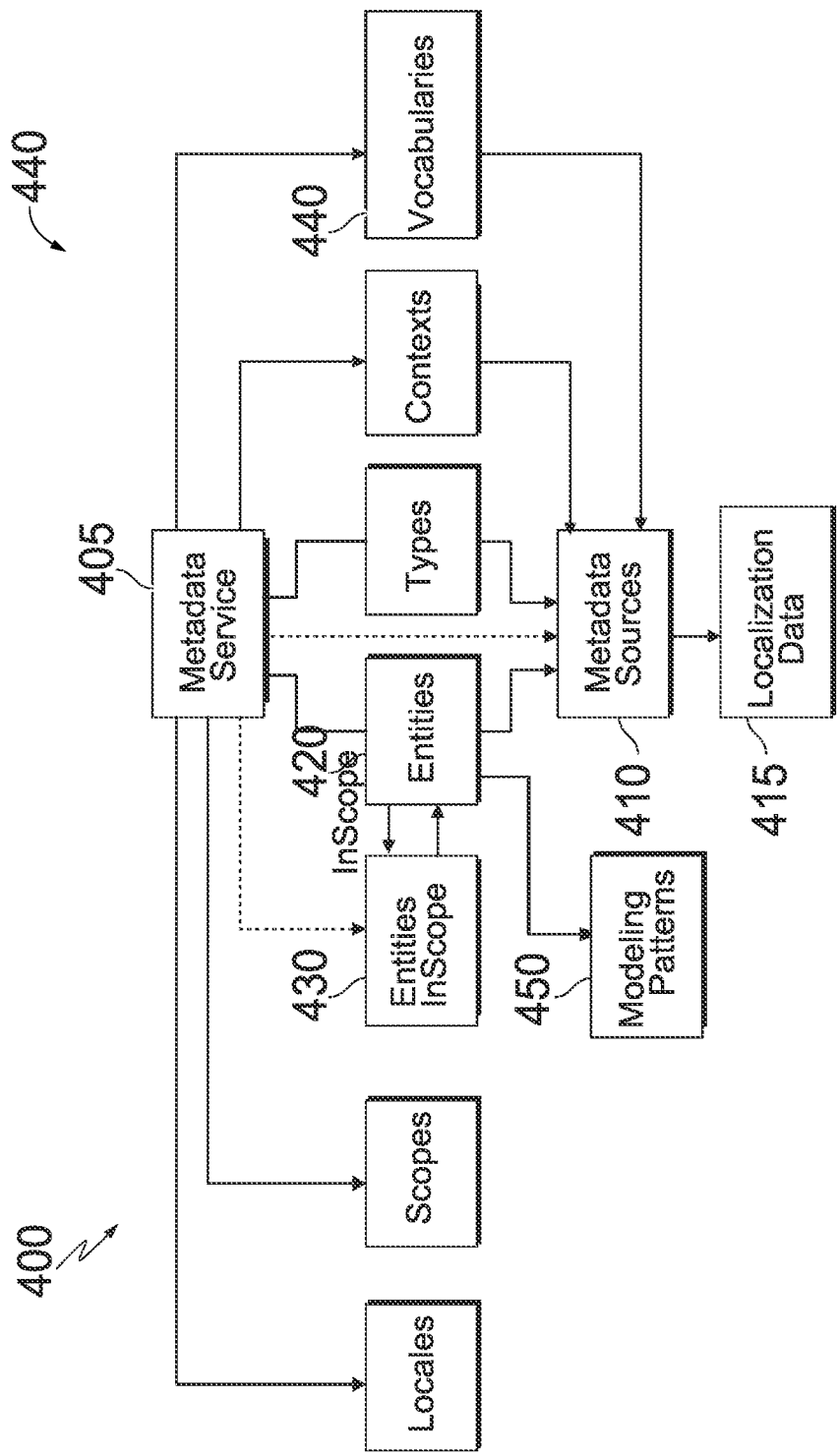
FIG. 4 is a block diagram of an example structure of a metadata integration service in accordance with implementations of the present disclosure.

In some instances, the metadata format that is used by the metadata service can define a metadata organizational structure including entities, types, context, vocabularies, localization, and/or scopes, among others, as discussed in relation to FIG. 4. The metadata format can include different attributes to annotate information for the entities that can be used to evaluate the associated data with the metadata. For example, an entity metadata instance can include information for a type of an object associated with the entity that is stored at the application. For example, an entity can have metadata attributes defining different aspects of the entity. In some instances, entities may be defined as related and associated with other entities, where, based on relationships between entities, different scopes of related data can be determined. For example, an entity that can be associated with metadata for a table data object can be related to other entities associated, for example, with other table data objects. In some instances, associations between entities can be defined based on underlying logic of relationships between objects corresponding to the entities, and such relationships can be defined through scopes. In some instances, an application can define a scope function that can be invoked to determine relevant entities to an initially requested one or more entities.

At 330, in response to establishing the connection, a view of content from the data source can be provided, wherein the view includes a list of entities from the service metadata model that are associated with the one or more data objects of the first application.

At 340, a query is received that is defined based on the list of entities identified at the view of the content from the data source to acquire metadata associated with the one or more identified entities. In some instances, the query can be defined at the separate application, for example, based on user requirements for invoking data (including data objects) from the first application.

In some instances, in response to receiving the query, one or more identifiers for the entities are identified and provided to a backend of the first application to query the data at the data source.

At 350, in response to evaluating the received query at the backend of the first application, the metadata for the identified entities from the data source associated with the first application is provided to the separate application.

FIG. 4 is a block diagram of an example structure 400 of a metadata service 405 in accordance with implementations of the present disclosure.

In some instances, the metadata service 405 can be defined to enable metadata export from one application that is to be imported in another application. For example, the metadata service can be similar to the described metadata service in the description of FIG. 3, or the metadata exposure service 215 of FIG. 2, or previously discussed metadata integration service.

In some instances, the metadata service 405 can be defined to transport metadata in a predefined metadata format that can be a standardized format. For example, the metadata service 405 can be defined to transport metadata in a CSN format. In some instances, an application can be implemented in accordance with a particular technology and can manage metadata for stored data objects in different manners and in different formats that can be different from the CSN format.

In some instances, an application can import metadata from multiple other application that store metadata in different formats that are also different from the CSN format. In those cases, the application can integrate several repositories with different data, for example, the data can be integrated from different sources at the same time on sequentially.

In some instances, metadata integration between applications can be implemented through implementing a metadata service to expose metadata of a source repository associated with metadata generated for data objects at a source application. In some of those instances, a single application can provide multiple data sources that can be used for exposing metadata through the metadata service 405. In some instances, the metadata service 405 can be implemented as an Open Data Protocol (OData) service that can be integrated in an application, such as the source application 205 of FIG. 2. The metadata service 405, as an OData service, can be integrated into the functionality of the application and can consume data through application programming interfaces (APIs) provided by other services part of the application. In some instances, the metadata service can consume RESTful APIs to acquire data that can be stored according to an underlying data model framework.

In some instances, the metadata service can keep a balance between maintaining a CSN document with CSN format metadata as a whole and a full structured definition of OData entities defined by the metadata service. In some instances, the balance can be maintained by providing specific data that can be used for performing filtering on the metadata to determine relevant metadata for importing (e.g., in many cases not all of the metadata is relevant for a transfer from one application to another).

In some instances, the metadata service 400 can expose a metadata structure of metadata from metadata sources 410, where the metadata structure can include multiple items including entities, types, contexts, locales, vocabularies, and scopes. Those items can be used to determine relevant metadata that can be invoked from the metadata sources 410 based on a request from an external service or application that consumes the metadata service. In some instances, based on providing a view of the metadata structure, identification of relevant metadata can be performed (through searching or otherwise determining) and relevant metadata can be exported to a requesting application or system.

In other instances, a request for importing metadata may be associated with metadata relevant for a given locale, for example, a session locale, and/or an intersection of locales that can be relevant for a receiver and/or a sender. For example, entities part of the metadata can be exposed in multiple available locales or with resources for a set of locales, where selection of one (or multiple relevant) locales can be performed to expose data for the selected locales. In some instances, metadata (e.g., CSN documents) can be split to provide a portion of the metadata transparent to the consumer from a metadata service point of view, while the rest of the data remains in the original metadata format. In some instances, the metadata service can expose additional data including administrative data associated with the metadata. For example, the metadata service can expose time data, such as a timestamp of a latest change to the metadata.

In some instances, the metadata service 405 can be defined independently of the backend of an application that uses it to expose the metadata. The metadata service 405 can provide metadata from sources, such as sources 410, where data sources can be associated with localization data 415.

In some instances, the metadata service 405 can expose a catalog view of the metadata structure that can be based on defined entities 420 in the metadata structure. The entities 420 can be defined to include multiple properties (that may or may not be defined in the metadata format) including entity name (or an identifier of the metadata entity), entity label (e.g., a language-dependent description of the entity that can be defined in session locales), a release contract related to the use of the metadata object by different customers and/or end users for importing the metadata (e.g., related to compatibility of the metadata objects to be consumed for internal or external use), a release state property that can identify whether a product that generated such metadata is in a release, obsolete or decommissioned state, a modeling pattern that annotates in a generic way what is the entity associated with and/or what is the entity's usage, and/or a time stamp of a latest modification, among other examples.

In some instances, metadata can be exposed from the metadata service 405 based on annotations identified in the metadata that can define semantics or intention of use of a metadata object. In some instances, modeling pattern 450 can annotate a type of an entity that can define the purpose of creating the entity. In some cases, the metadata service can support filtering based on a selected type. In some instances, a type can be associated with multiple locales that can include language-dependent description for the types (e.g., EN, FR, DE, etc.), where filtering based on locale can also be supported.

In some instances, the metadata service 405 exposes data in a catalog view that includes information for the entities, where the entities are associated with the metadata sources 410 that include an actual source metadata that can be associated with a source application, such as the source application 205 of FIG. 2. When metadata based on a given source from the metadata sources 410 is exposed, the metadata service can provide a view of the entities defined in the source (e.g., which can be a metadata document defined in a given format (e.g., JSON) that follows a metadata model (e.g., CSN format)). The metadata service 405 can provide service filtering capabilities of the metadata, since the metadata service 405 can be an OData service.

In some instances, several metadata sources associated with multiple applications can expose their content though a single metadata service 405, where metadata can be provided based on a specification of the metadata service that defines a structure of the metadata. In some instances, the metadata may include entities definitions, but where no content is specified. In cases where multiple metadata sources are integrated, the metadata sources can be identified with unique identifiers for the different repositories. The identifiers associated with different sources of metadata can be interpreted as prefixes (or annotations) that can identify or assist in identifying a metadata context as an element of the structure of the metadata. In some instances, metadata sources can represent embedded repositories that include multiple namespaces as part of a given metadata context, where different identifiers for the repositories can be used to expose data from different hierarchical level of the repositories. The metadata service can provide information for the namespaces as a context annotation added to the metadata in an appropriate syntax form.

In some instances, when a request for importing metadata for an entity is received from an application, such as a data warehouse application invoking metadata from a source application, it may be required that all relevant data that includes data for other entities associated with the requested entity is also determined for import. In some instances, associations can be introduced between entities within the entities 420, where an association can be introduced to define a function defining relationships between properties of entities, such as a star schema data model. Based on defined associations between entities in the entities 420, entities inScope 430 association can be defined. As a result of the associations defined at 430, entity type "Entities" can be exposed to include a list of entities comprising an entity that served as starting point, and further entities that are defined as associated with the entity at the starting point in 430. Further tools can be provide to navigate further to sources 410 and localization data 415 to filter entities based on namespaces and locale. In some instances, the associations can be parameterized by a concrete hull function, where there can be a list of available hull functions that can be queried to provide identifiers of entities can be displayed on a user interface of the metadata service 405.

In some instances, when metadata is exposed, the annotation definitions can also be exposed, which can be done by defining an entity "Vocabularies" 440.

In some instances, the metadata service 405 can provide a user interface that can be used to present views of structures of metadata that can be exposed to support providing of basic search features based on parameters, annotations, etc. according to the specification of the metadata service 405.

Metadata Integration Based on Scope Function Definition

In some instances, once a data consumer (e.g., a user and/or an application such as a data warehouse application) initiates a request for content related to an entity that is exposed through a metadata service such as the metadata service 405 of FIG. 4, or the metadata services discussed in association with FIGS. 1, 2, and/or 3, the metadata service can evaluate the request to determine relevant content for the request. In some instances, the metadata service may provide options for the requestor to identify a scope of the request that can be used to determine the relevant data. In some instances, determination of relevant data can be performed by invoking a scope function for the received input with the request for content. The scope function can be executed to resolve dependencies between the entity(ies) identified in the request and other entities part of the metadata structure. In some cases, the scope function can be executed as part of the metadata service execution, for example, when scope functions logic is provided from a source application to the metadata service. In other cases, the scope function can be executed on the source application side.

In some instances, if the scope determination (or scope resolution) is performed at a metadata service side of a metadata service that exposes metadata for one or more application to a data consuming application (e.g., data warehouse application), each application can provide an implementation including respective algorithms for scope functions associated with the metadata entities to a respective instance of the metadata service. In some other instances, if scope resolution is done centrally at a single metadata service, one implementation of algorithms for scope resolution for relationships between entities based on defined scopes can be provided at the metadata service to provide scope functionality to data consumers. In some more instances, one or more applications can integrate a metadata service as part of the service layer of the application where the metadata service can implement logic for executing scope resolution, while some other applications can rely on a central metadata service that provides a central implementation of scope resolution based on application-specific input. In those instances, metadata can be selected and imported at a data consuming application through the central metadata service and through a direct connection with other application that implement a metadata service internally.

In some instances, when metadata is requested to be imported, a consumer can determine required data, and may define restrictions to the transferred particular data, such as new data that is only associated with updated entities, or restricted in other way (e.g., defined with a query). In some instances, by providing the option to import portions of metadata at different iterations, efficiency of communication during the import process can be achieved, as only data relevant at certain times is transferred and duplicates of transferred data can be minimized. For example, if one entity includes data from several other entities that are also part of a second entity, then when a second entity is imported, data for those other entities part of the first entity may not be needed to be imported if they have not been changed since they were previously imported.

Figure 5:
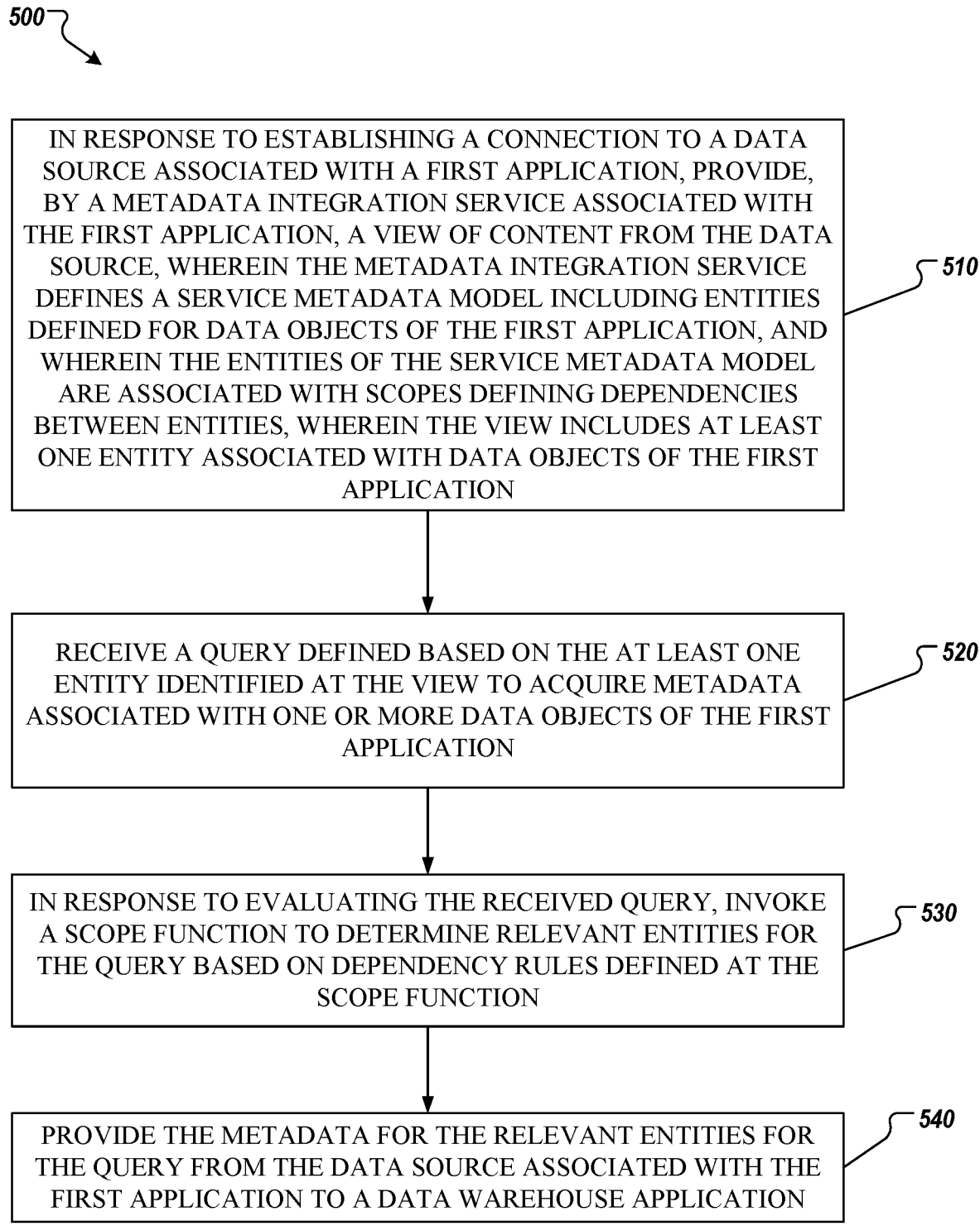
FIG. 5 is a flowchart for an example method for exchanging metadata between applications based on a scope function definition in accordance with implementations of the present disclosure.

FIG. 5 is a flowchart for an example method 500 for exchanging metadata between applications based on a scope function definition in accordance with implementations of the present disclosure.

In some instances, a metadata service such as the metadata service 400 of FIG. 4 may provide scopes 450. In some instances, scopes may be defined with scope resolution functions for scope resolution of entities associated with one or more applications. In some cases, the scope resolution functions may differ from corresponding scope functions at the respective one or more applications. In such cases, an application that exposes its metadata through the metadata service can be configured whether to apply scope functions implemented on the application's side or scope functions defined at the metadata service's side.

In some instances, when the metadata service is defined as an OData service, the scope functions can be defined as OData functions as part of the service implementation, or as OData navigations. When a data consuming application requests metadata from the metadata service, the metadata service may expose a list of available functions that can be presented to a user for selection.

In some instances, when a request for metadata for an entity is received and a scope function is identified (e.g., via a user selection through a user interface at a consuming application that interacts with the metadata service), multiple metadata sources that include metadata content can be transported as a single metadata document that includes content defined based on the invoked scope function to the consuming application.

In some instances, method 500 can be executed in the context of importing metadata from a source application into a target application, where the imported metadata is determined based on a requested scope for relevant content to a requested metadata entity. For example, a request for a single metadata entity may be evaluated to determine one or more other entities as related (e.g., embedded or linked), and metadata for determined entities within the requested scope can be exposed through the metadata service for importing at the target application.

In some instances, the metadata service can be a metadata integration service that can facilitate integration of metadata from one or more source applications into a data warehouse application.

In some instances, the metadata integration service can connect to one or more data sources, including metadata content of respective one or more applications.

At 510, in response to establishing a connection to a data source associated with a first application, a view of content from the data source is provided by a metadata integration service associated with the first application. The view can include at least one entity associated with data objects of the first application. The metadata integration service can define a service metadata model that includes entities defined for data objects of the first application. The entities of the service metadata model can be associated with scopes defining dependencies between entities, for example, as discussed for FIG. 4.

At 520, a query defined based on the at least one entity identified at the view is received. The query is defined to acquire metadata associated with one or more data objects of the first application.

At 530, in response to evaluating the received query, a scope function used to determine relevant entities for the query based on dependency rules defined at the scope function is invoked.

In some instances, the invoked scope function can be implemented as part of the metadata integration service. In other instances, the invoked scope function can be a scope function that is part of the logic of the first application, or, alternatively, that is a combination of both the metadata integration service and the first application's logic based on predefined scope invocation rules.

At 540, the metadata for the relevant entities for the query from the data source associated with the first application is provided to the data warehouse application. In some instances, the data warehouse application can be a data warehouse cloud platform.

In some instances, the metadata integration service can be executed to provide services similar to the services provided by the metadata service describes in FIG. 3.

In some instances, once the scope function is invoked to determine relevant entities, the entities can be defined in a list, and packages may be determined to split the list into sets that can be invoked from the source application in portions. Since packages can be defined after one execution of the scope function, gathering of data related to packages can be done iteratively and without invoking the scope function for subsequent executions.

In some other instances, splitting lists of entities that are defined based on a received request(s) can be performed without invoking a scope function, but for example, in response to requests for extensive number of metadata objects.

Figure 6:
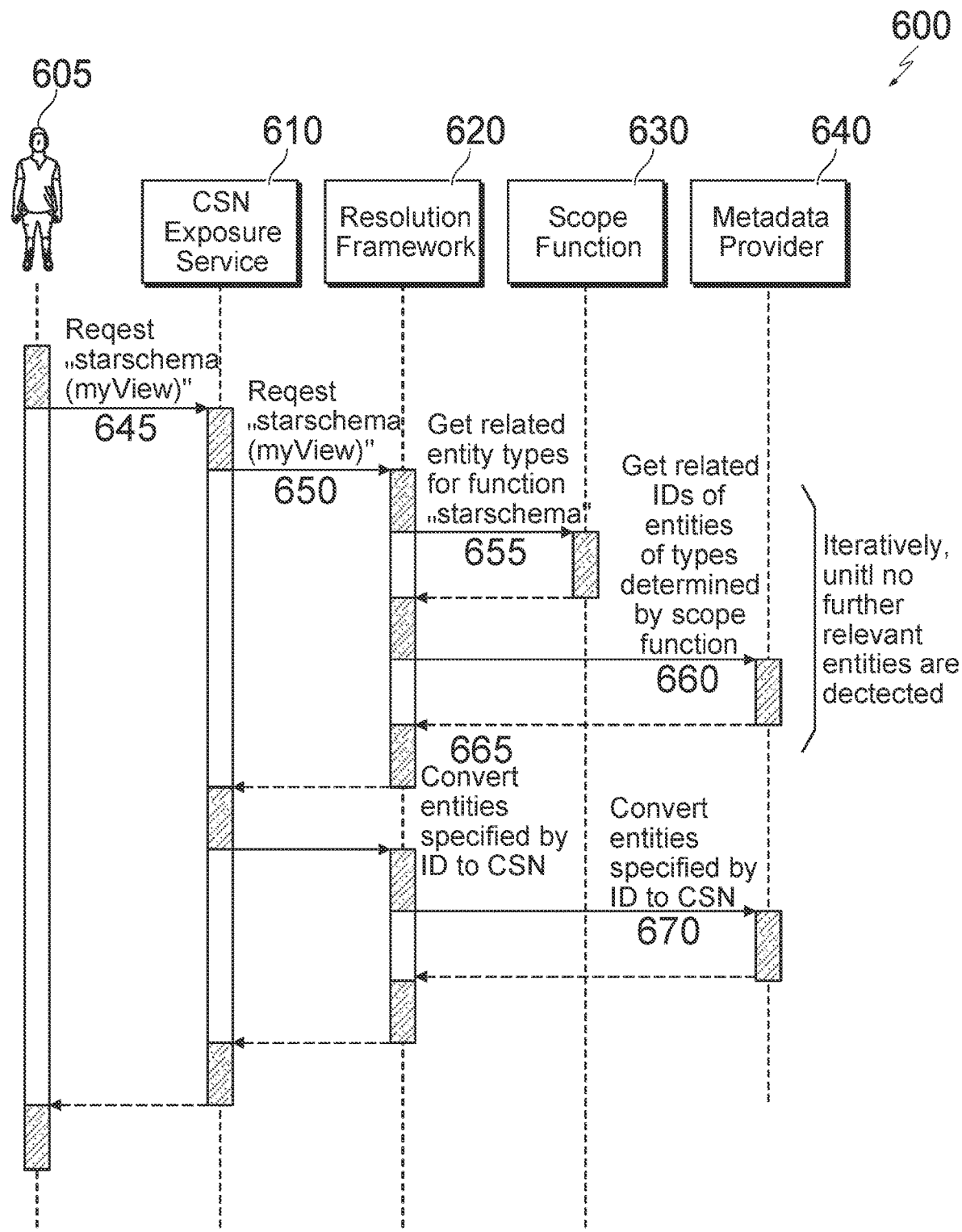
FIG. 6 is a sequence diagram of an example method for invoking metadata from a metadata provider based on scope functions according to the implementations of the present disclosure.

FIG. 6 is a sequence diagram of an example method 600 for invoking metadata from a metadata provider based on scope functions according to the implementations of the present disclosure.

In some instances, a user 605 requests to view of a catalog (or a list) of entities associated with a star schema scope function, where the request is for viewing entities associated with metadata content for respective data objects of a first application. The user 605 can send a request 645 to a metadata exposure service 610 that exposes metadata in a CSN format. In some instances, the request 645 can be received from an application, service, or a system, rather than from a user. The metadata exposure service 610 may be a metadata service or metadata integration service as described above for FIGS. 1-6. The metadata exposure service 610 can send a request 650 to request content for entities associated with the identified entities with the request 645. The metadata exposure service 610 can send the request 650 to a resolution framework 620 that can evaluate the request to resolve dependencies between the identified entities with the request 645. The resolution framework 620 can send a request 655 to a scope function 630 to invoke related entity types associated with the identified entity by invoking a scope function for each of the entities. The scope function 630 can provide a list of entities of types determined based on logic implemented at the scope function. For example, different types of scopes can be associated with different entities. In some instances, the request 645 can be associated with a selected scope from a list of scopes including a star schema scope for determining related entities to a given entity, a graph search algorithm (e.g., Star schema for identifying related entities to an entity from a data structure), or other suitable scope examples.

In some instances, the resolution framework 620 can request 660 to acquire identities of entities of the types identified as related by the scope function 630 module according to the star schema scope definition. The scope function can rely on a metadata object type and can be used to traverse interconnected metadata objects to identify objects of relevant types (e.g., analytical dimension, text, hierarchy, and others). In some instances, the metadata objects can be interconnected in a graph structure and each node of the graph can be traverses to over the whole structure until the algorithm covers all nodes or there is no returned object type.

In some instances, the scope function can be executed to perform a selection process to determine connections (and/or interrelations) between entities defined in the metadata. For example, when an entity is selected for providing metadata, the scope function can further determine that a related text table is also to be provided. For example, the text table can include language-dependent translations of descriptions (e.g., a product name). Further, when an entity is selected, based on the type of the entity, further entities of other related types can be provided. For example, if a sales order is selected, the scope function can determine that entities for the sales order items can also fall within the scope and be provided as well as the sales order. In some instances, different scope functions can be implemented based on logic for interconnecting entities. For example, the scope function can be a transitive hull function to provide all entities that are connected or associated within the schema.

In some instances, the request 660 can be directed to a metadata provider 640 that provides metadata in a CSN format associated with the first application. In some instances, the execution of requests 655 and 660 can be executed iteratively for each of the entities that are initially requested with the request 645. The resolution framework 620 can convert, at 665, entities specified by the identifiers to CSN entities that can be exposed by the metadata exposure service 610, for example, as a list of entities that correspond to the received request 645. The resolution framework 620 can request from the metadata provider 640 further content for the entities based on a selection for one or more of the entities provided as part of the result list exposed by the metadata exposure service 610. The resolution framework 620 can send a request 670 to acquire CSN metadata for identified entities from the list of provided entities by the scope function 630.

In some instances, the scope function 630 can work iteratively to abstract specifics of the metadata provider by introducing an abstraction layer that can act as a common basis for processing the metadata, such as by introducing metadata that describes the entity types, including but not limited to dimension, text, hierarchy, and others. In some instances, a scope function 630 can receive an entity type and can return a list of entity types that are required for the received entity type. In some instances, a metadata provider, such as metadata provider 640, can implement a self-description method that defines its type-code.

Importing Data Objects Metadata Based on Application Interface to Service Entity Mappings In some instances, a data warehouse application, such as the data warehouse application described in FIGS. 2, 5, and/or throughout this disclosure, can import metadata from other applications, where the metadata can be provided as input to a deployer. The metadata that can be provided as input can be provided or received in a standard metadata format. For example, the input may be in a CSN format, and may be received in the form of a CSN document. In some instances, the applications from which the metadata is imported can generate metadata in different formats, where conversion of the content can be performed to provide the metadata for input in a predefined or common format, such as the CSN format in one example.

Figure 7:
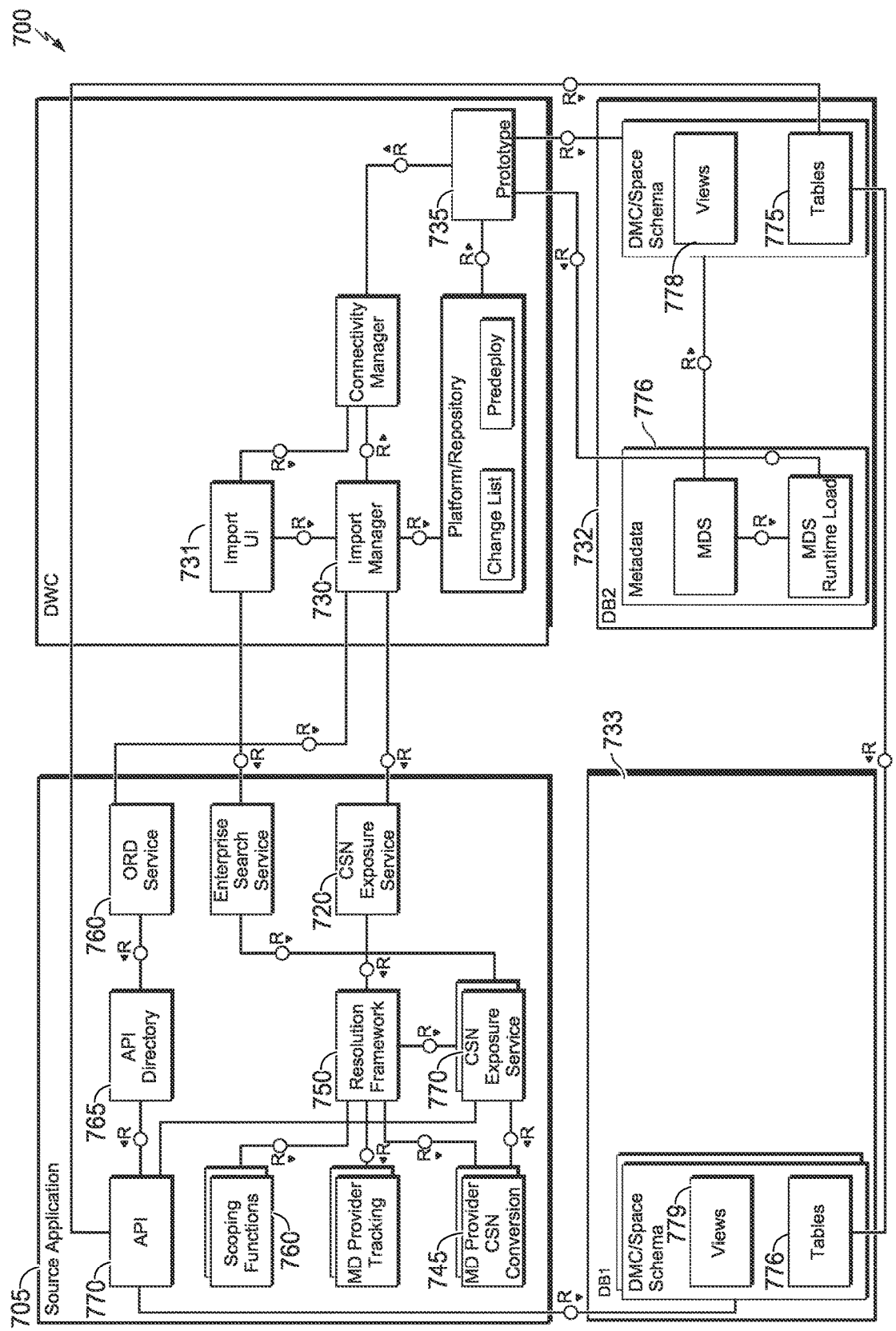
FIG. 7 is an example system that is operable to import metadata based on mappings between application interfaces and service entities according to implementations of the present disclosure.

FIG. 7 is an example system 700 that can import metadata based on mappings between application interfaces and service entities according to implementations of the present disclosure. In some instances, the example system 700 includes multiple applications and components that interact to exchange metadata.

In some instances, the system 700 includes a source application 705 provided with a metadata exposure service 720 exposing metadata associated with data objects of the source application 705 to a data warehouse application 710. In some instances, the metadata exposure service 720 can be similar to the metadata exposure service 215 of FIG. 2 that can be defined to expose metadata of a predefined metadata format from a data source, such as the metadata provider 745. In some instances, the metadata provider 745 may consume metadata from repository 740 that is generated in an application-specific format, and can convert the metadata to the predefined metadata format that can be used for the metadata exposure. The metadata content at the repository 740 may be associated with a data storage where data objects of the source application are stored. For example, the data objects can be business objects, such as purchase orders, sales orders, department manager roles, users, products, and other example business objects.

In some instances, the data warehouse application 710 includes an import user interface (UI) component 731 that supports user interactions associated with requests for importing metadata and initiating searching calls to trigger import execution of metadata from the source application 705. In some instances, the source application 705 and the data warehouse application 710 can be similar in their performance and functionality (including functionality of the corresponding component) to the source application 205 and the data warehouse application 210 of FIG. 2.

In some instances, a request can be sent through the import manager 730 to the metadata exposure service 720 to request a view of service entities defined based on metadata created for data objects of the source application 705. In some instances, the entities that can be provided can be entities of the structure of the metadata exposure service that can be substantially similar to the structure 400 of a metadata service 405.

In some instances, the metadata exposure service 720 can support metadata importing from the source application 705 to the data warehouse application 710. However, there may be information about runtime application programming interfaces (APIs) available at the source application 705 that are relevant to and can be used for actually accessing the data. In some instances, APIs can be defined at least partially based on metadata for the underlying data of the source application 705. Therefore, there can be an alias between a service involved and metadata entities. The API definition 765 can list all the available APIs that are provided by the source application 705.

In some instances, mappings between runtime APIs and metadata entities can be defined. In some instances, a discovery service, such as an open resource discovery (ORD) service 760 can be provided to support metadata integration, for example, in the context of cross-application analytics. The ORD service 760 can be an application-specific service that can be implemented by the source application for providing a connection between metadata entities that may be requested for importing through the import manager 730 and the relevant APIs that are provided by the source application 705.

In some instances, an API may include a mapping section that can identify relevance between sections of the API and metadata entities. In some instances, a section of an API may be mapped to one or more metadata entities from the structure of the metadata exposure service as defined by the metadata format (e.g., CSN format). The definition of the mappings can be specific to the technology of a particular API. Further, the definition of the mapping can be also based on a modeling pattern of the metadata entity that is related. For example, a cube or a query is likely to be accessed via a federation, and lower-level entities can be associated with replication.

In some instances, API offerings can be evaluated to determine a correspondence between an API and a metadata entity. In some instances, available APIs can be filtered by an adapter technology that is supported for a connection that is available for accessing the data. In those instances, a data access mode (e.g., federation or replication) can be determined from the metadata, for example, based on annotations identified for the entities. Further, a preference vector can be applied for the adapter technologies that are determined based on the data access mode, and an API can be identified.

In some instances, the ORD service 760 can gather or otherwise identify mappings between APIs and metadata entities, and can provide information for generating data calls to the source application repository 740 to gather the data based on an identification of relevant metadata entities for a given metadata request.

In some instances, the import manager 730 can determine metadata entities as a response to an import request based on request criteria. In one example, the import manage 730 may receive a request to import metadata associated with a set of product sales order. The import manager 730 can receive a response from the metadata exposure service with metadata entities that are relevant for the request. In some instances, the relevancy can be determined based on invoking one or more scope functions from the scope functions 760. In some instances, the relevant entities can be determined as described for example at FIGS. 2, 3, 5, and 6. Once metadata entities are identified, the import manager 730 can query the ORD service 760 based on the identified metadata entities to determine relevant APIs that can be invoked to acquire the data. The relevant APIs can be determined from the API directory and based on mappings defined between metadata entities and APIs and/or API sections. In such cases, the ORD service 760 can provide a response to the import manager 730 that identifies relevant APIs that can be invoked to consume the data.

In some instances, the import manager 730 can import metadata and mapping data that maps the mapped APIs to metadata entities. The imported metadata and mapping data can be stored at a repository at the data warehouse application 710. The stored metadata and mapping data can be used to deploy a metadata model at the database. In some instances, the metadata and the mapping data, which defines the mappings between the entities from the metadata and the corresponding APIs, can be provided through a connection manager to a deployer 735 to deploy data models for storing data at a database (DB), such as DB2 732. As illustrated, DB 732 includes metadata 776 and data stored at a space schema according to the metadata model of the metadata. The deployer 735 can interact with the DB2 732 to connect deployed models with data stored at a space schema that includes views 778 and tables 775. The tables 775 include data objects associated with the imported metadata.

In some instances, based on imported metadata and APIs determined to be relevant and associated with the identified metadata entities, DB2 732 can be configured to establish an automatic connection between the space schema and relevant APIs, such as API 770, at the source application to acquire data for the identified entities. The API 770 can process a request to request data and invoke the data from DB1 733 that is associated with the source application. DB1 733 stores data at tables 776 and views 779, where the data includes metadata for data objects created by the source application exposed through the metadata exposure service 720.

Figure 8:
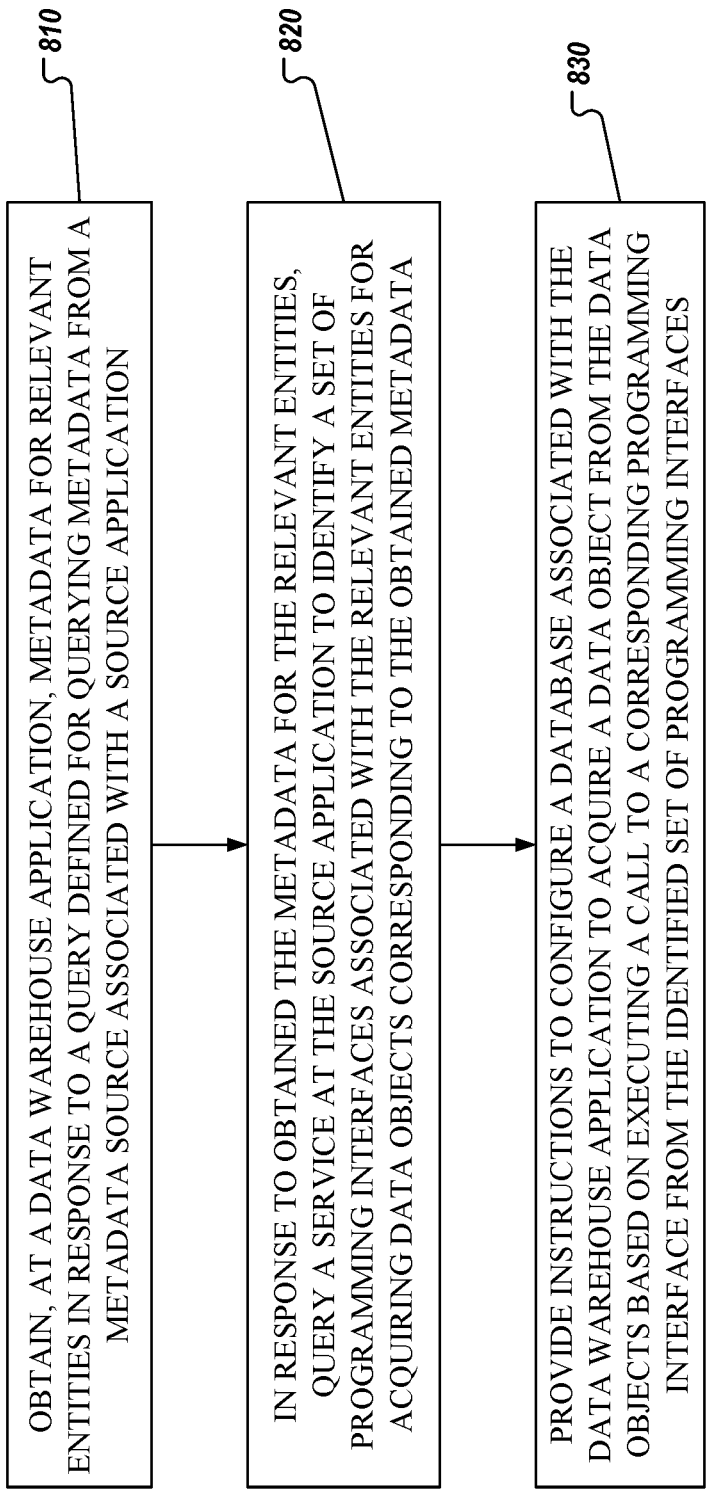
FIG. 8 is a flowchart for an example method for importing of metadata based on mappings between application interfaces and service entities according to implementations of the present disclosure.

FIG. 8 is a flowchart for an example method 800 for importing metadata based on based on mappings between application interfaces and service entities according to implementations of the present disclosure.

In some instances, the method 800 can be executed at the example system 700 of FIG. 7.

At 810, metadata for relevant entities is obtained in response to a query defined for querying metadata from a metadata source associated with a source application. The metadata is obtained at a data warehouse application similar to the data warehouse application 710 of FIG. 7. The data warehouse application can obtain the metadata at an import manager that interacts with a metadata exposure service that is associated with the source application. The metadata exposure service may define a metadata model including entities, types, scopes, context, locales, and others as described in FIG. 4. The metadata exposure service may also provide scope functionality to determine relevant metadata for a query identifying a metadata entity. In some instances, the metadata exposure service may apply an algorithm implemented in a scope function to determine associated entities to the metadata entity that is identified at the query. In some cases, the scope function and its logic can be invoked from a separate component of the source application, or can be embedded in the metadata exposure service. In some instances, one metadata exposure service may be associated with exposing metadata for multiple source applications.

At 820, in response to obtaining the metadata for the relevant entities, a service at the source application can be queried to identify a set of programming interfaces associated with the relevant entities. In some instances, the service may be similar to the ORD service 760 of FIG. 7. The set of programming interfaces can be identified as to determine which interfaces are relevant for invoking and acquiring data objects corresponding to the obtained metadata, for example, from a database associated to the source application.

At 830, instructions to configure a database associated with the data warehouse application are provided. For example, the database can be configured based on the provided instructions to automatically call exposed programming interfaces (e.g., APIs) by the source application based on requests defined according to acquired metadata for data objects from the source application. In some instances, based on configurations at the database as defined according to the instructions at 830, the database can automatically connect to the source application to invoke relevant database objects based on queries defined according to the acquired metadata. Such queries defined for acquired metadata may be processed to identify corresponding relevant APIs that are mapped to the metadata in the query, and a call to one or more APIs to access data (such as data objects associated with queried metadata entities) from the source application. The instructions can be generated at an import manager at the data warehouse application. The configurations can be defined to configure calls to acquire a data object from the data objects to a corresponding programming interface from the identified set of programming interfaces determined as related to the metadata entity associated with the data object.

In some instances, the configuration can be executed at the database to provide for automatic data gathering between data storages. In some instances, the data warehouse can configure the database to automatically acquire data from multiple data storages associated with multiple source applications, where the data warehouse application can acquire data from multiple applications in a context of data accumulation and cross-analytics.

Automatic Configuration of Data Invocation from One or More Sources Based on Metadata Mappings In some instances, a database, such as the database 732 of FIG. 7, can receive instructions from a deployer that is running at a data warehouse application (e.g., the data warehouse application described in FIGS. 2, 5, and/or throughout this disclosure) to configure import of metadata from other applications. The database can receive configuration details for importing data from a source application and can be set to automatically connect to the source application (e.g., the source application 705, FIG. 7) to import data. The database can be automatically configured by implementing queries based on the received configuration details that can be used to request data from the source application. In some instances, the database can receive the instructions to generate a configuration as an output of a process to import metadata based on defined mappings between application interfaces and entities at the source application. For example, the database can be configured according to received instructions from a method such as method 700 of FIG. 7.

Figure 9:
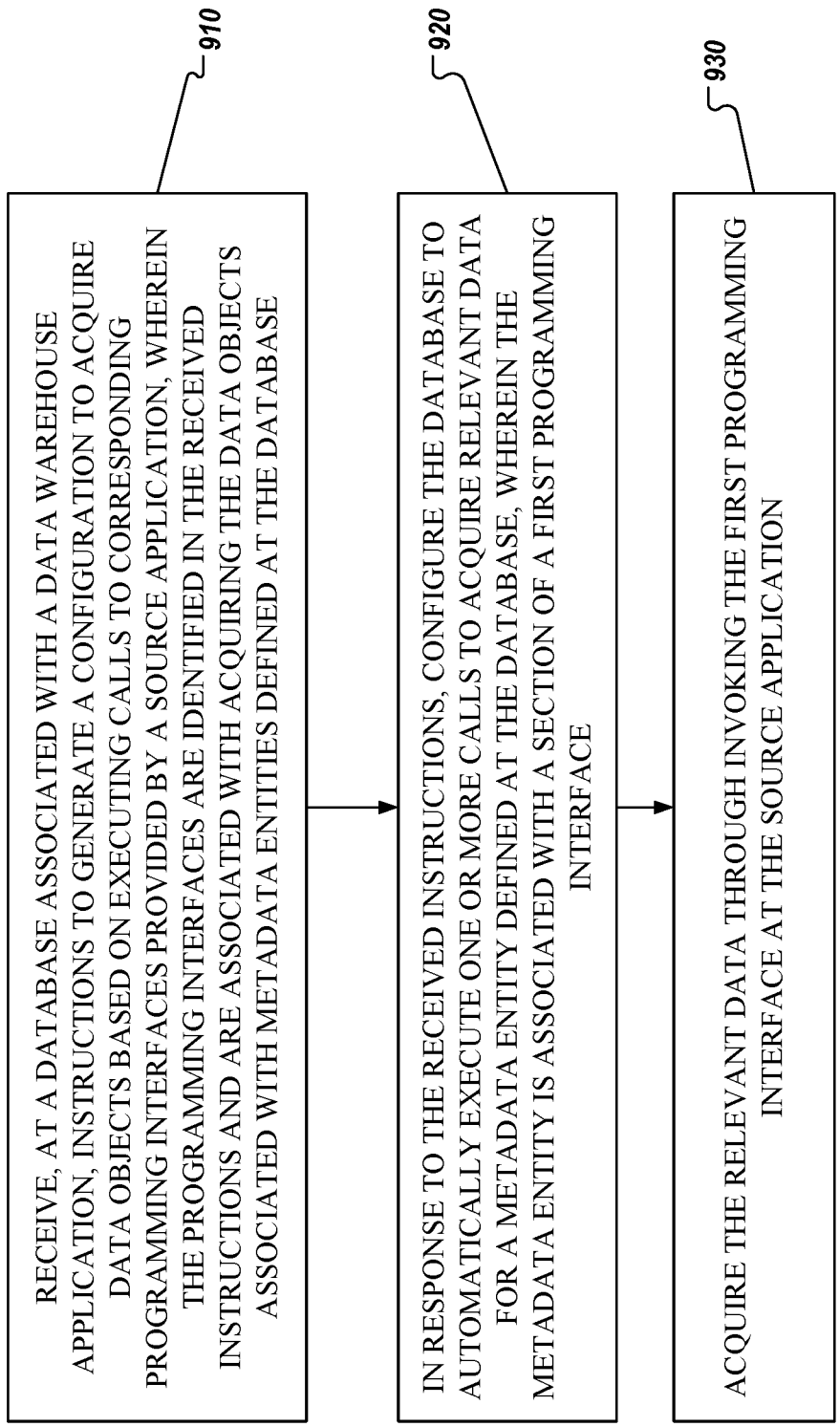
FIG. 9 is an example method for automatic configuration for invoking data from one application into another application according to implementations of the present disclosure.

FIG. 9 is a flowchart for an example method 900 for automatic configuration for invoking data from one application into another application according to implementations of the present disclosure.

In some instances, the method 900 can be executed at the example system 700 of FIG. 7.

The example method 900 can be executed in the context of configuring a database storing data of a data warehouse application, where data to be stored at the data warehouse application is defined based on metadata entities acquired from metadata sources associated with a source application. In some instances, a data warehouse application can browse and select metadata that can be used to generate a model, and then to deploy the model at a database to store data associated with the modeled metadata. In some instances, for the generation and the deployment of the model, information about the manner of collecting the data based on the metadata can be defined. In some cases, information about relevant programming interfaces (e.g., APIs) for invoking data associated with metadata entities can be combined with the metadata to generate and deploy the model at the database. These deployed models can be used to automatically connect to a source application database and directly invoke the data, thereby achieving independent data acquisition that can be performed in a timely and efficient manner.

At 910, instructions to generate a configuration to acquire data objects are received at a database associated with a data warehouse application. The configuration is generated to support automatic execution of calls to corresponding programming interfaces provided by a source application. The programming interfaces can be identified in the received instructions and are associated with acquiring the data objects associated with metadata entities defined at the database.

At 920, in response to the received instructions, the database is configured to automatically execute one or more calls to acquire relevant data for a metadata entity defined at the database, wherein the metadata entity is associated with a section of a first programming interface.

At 930, the relevant data is acquired through invoking the first programming interface at the source application. In some instances, calls to the first programming interface can be defined to be automatically executed (e.g., on regular intervals, according to a scheduling scheme, and in response to events, among other examples) and to obtain data directly from the source application. For example, the calls can be defined with regard to certain metadata entities. Mappings of correspondence between metadata entities and programming interfaces can be configured at the database, for example, based on information obtained from a data warehouse application such as data warehouse center 710 of FIG. 7. Based on the mappings between these metadata entities to programming interfaces, automatic calls in association with these metadata entities can be performed and data can be acquired from the source application at the database.

Figure 10:
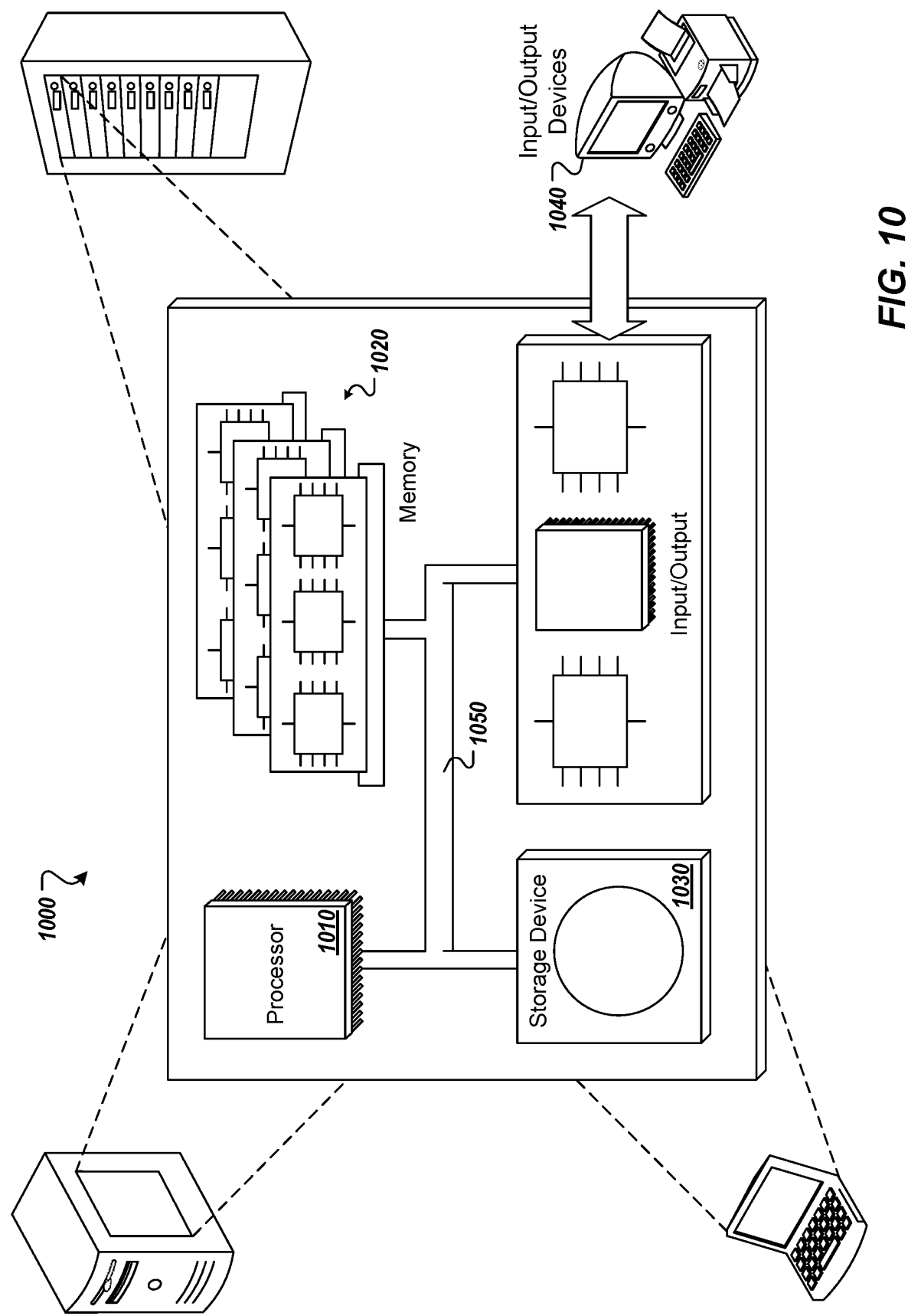
FIG. 10 is a schematic illustration of example computer systems that can be used to execute implementations of the present disclosure.

Referring now to FIG. 10, a schematic diagram of an example computing system 1000 is provided. The system 1000 can be used for the operations described in association with the implementations described herein. For example, the system 1000 may be included in any or all of the server components discussed herein. The system 1000 includes a processor 1010, a memory 1020, a storage device 1030, and an input/output device 1040. The components 1010, 1020, 1030, and 1040 are interconnected using a system bus 1050. The processor 1010 is capable of processing instructions for execution within the system 1000. In some implementations, the processor 1010 is a single-threaded processor. In some implementations, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. In some implementations, the memory 1020 is a volatile memory unit. In some implementations, the memory 1020 is a non-volatile memory unit. The storage device 1030 is capable of providing mass storage for the system 200. In some implementations, the storage device 1030 is a computer-readable medium. In some implementations, the storage device 1030 may be a floppy disk device, a hard disk device, optical disk device, or a tape device. The input/output device 1040 provides input/output operations for the system 1000. In some implementations, the input/output device 1040 includes a keyboard and/or pointing device. In some implementations, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also (alternatively) defined in accordance with the following examples:

Metadata Integration

Example 1. A computer-implemented method for exchanging metadata between applications, the method comprising:
   providing a metadata service defining a service metadata model for exposing metadata of data objects defined at one or more applications;
   in response to receiving a request for importing metadata from a first application of the one or more applications to a separate application, establishing a connection to a data source associated with the first application to acquire the metadata from the data source for one or more data objects related to the first application;
   in response to establishing the connection, providing a view of content from the data source, wherein the view includes a list of entities from the service metadata model associated with the one or more data objects of the first application;
   receiving a query defined based on the list of entities provided at the view of the content from the data source to acquire metadata associated with the one or more identified entities; and
   in response to evaluating the received query at a backend of the first application, providing the metadata for the identified entities from the data source associated with the first application to the separate application.

Example 2. The method of Example 1 or 2, wherein in response to receiving the query, one or more identifiers for the entities are identified and provided to the backend of the first application to query the data at the data source.

Example 3. The method of any one of the preceding Examples, wherein the service metadata model comprises scopes defined for the entities, wherein a set of scopes are defined for the list of entities associated with data objects of the first application.

Example 4. The method of any one of the preceding Examples, wherein the list of entities from the service metadata model that are associated with the one or more data objects of the first application are determined based on invoking a scope function defined at the metadata service, where the scope function determines which types of entities are related to each of the entities from the one or more identified entities from the list.

Example 5. The method of any one of the preceding Examples, wherein the one or more applications store metadata related to corresponding sets of data objects, wherein metadata related to different sets of data objects is stored according to different metadata models.

Example 6. The method of any one of the preceding Examples, wherein the method further comprises:
   transforming metadata of the data objects from the one or more applications into metadata that is in a predefined notation for representation of metadata according to the service metadata model predefined by the metadata service.

Example 7. The method of any one of the preceding Examples, wherein the service metadata model is defined in JSON format.

Metadata Integration Based on Scope Function Definition

Example 1. A computer-implemented method for exchanging metadata between applications, the method comprising:
   in response to establishing a connection to a data source associated with a first application, providing, by a metadata integration service associated with the first application, a view of content from the data source, wherein the metadata integration service defines a service metadata model including entities defined for data objects of the first application, and wherein the entities of the service metadata model are each associated with different scopes defining dependencies between entities, wherein the view includes at least one entity associated with data objects of the first application;
   receiving a query to acquire metadata associated with one or more data objects of the first application, the query defined based on the at least one entity identified at the view; and
   in response to evaluating the received query, invoking a scope function to determine relevant entities for the query based on dependency rules defining scopes for entities at the scope function; and
   providing the metadata for the relevant entities for the query from the data source associated with the first application to a data warehouse application.

Example 2. The method of Example 1, wherein the scope function is invoked for execution at a backend of the first application.

Example 3. The method of Example 1 or Example 2, wherein the scope function is invoked for execution at the metadata service, wherein logic of the scope function is implemented at the metadata service based on input logic from the first application.

Example 4. The method of any one of the preceding Examples, further comprising:
   implementing the metadata integration service defining the service metadata model for exposing metadata of data objects defined at the first application;
   receiving, at the metadata integration service, a request from an import user interface at the data warehouse application for importing metadata at the data warehouse application, wherein the metadata is for one or more data objects stored by the first application; and
   establishing the connection from the metadata integration service to the data source to acquire the metadata from the data source for the one or more data objects.

Example 5. The method of any one of the preceding Examples, wherein the data warehouse application is a data warehouse cloud platform.

Example 6. The method of any one of the preceding Examples, wherein, in response to receiving the query, one or more identifiers for the entities are identified and provided to a backend of the first application to query the data source.

Example 7. The method of any one of the preceding Examples, wherein the metadata service exposes metadata according to a service structure including entities and scopes defined for the entities, wherein the entities are annotated to provide contextual description of respective data objects associated with the entities.

Example 8. A computer-implemented method for exchanging metadata between applications, the method comprising:
  establishing a framework for metadata integration between applications based on a defined service metadata model for exposing service metadata of data objections of the applications, wherein the metadata from different applications has different formats;
  in response to receiving a query request to import data from a first application, the request being received from a second application and for a portion of data objects of the first application:
    invoking a scope function for identifying entities corresponding to the query request, wherein the scope function is implemented for the first application, and wherein the identified entities are determined based on identifying relevant entities to entities corresponding to objects from the portion of the requested data objects of the first application with the received query; and
    in response to invoking the scope function, receiving a list of entities determining identifiers of identified entities by the scope function for the first application, wherein each entities of the list of entities is related to the portion of data objects of the first application; and
  in response to receiving a request to import metadata for one or more entities of the received list from a data source of the first application, wherein the metadata is to be imported into the second application:
    converting entities specified by the identifiers of the one or more entities to entities of the service metadata model defined by the framework; and
    invoking the metadata for the entities of the service metadata model from the data source associated with the first application to be imported at the second application, wherein the invoked metadata is defined according to the service metadata model.

Importing Data Objects Metadata Based on Application Interface to Service Entity Mappings Example 1. A computer implemented method for importing data objects, the method comprising:
  obtaining, at a data warehouse application, metadata for relevant entities in response to a query defined for querying metadata from a metadata source associated with a source application;
  in response to obtaining the metadata for the relevant entities, querying a service at the source application to identify a set of programming interfaces associated with the relevant entities for acquiring data objects corresponding to the obtained metadata from the source application; and
  generating instructions to be used to configure the database associated with the data warehouse application to acquire a data object from the data objects based on executing a call to a corresponding programming interface from the identified set of programming interfaces; and
  providing the generated instructions to the database to configure the database to automatically execute the call to acquire the data object from the source application.

Example 2. The method of Example 1, wherein the service at the source application determines the set of programming interfaces based on predefined mapping relationships between metadata entities and programming interfaces defined at the source application.

Example 3. The method of Example 1 or Example 2, wherein the query for the metadata from the metadata source is associated with a metadata entity, and wherein the obtained metadata includes metadata for the identified metadata entity and metadata for related entities that are identified as related based on a scope function.

Example 4. The method of Example 3, wherein the scope function is implemented and executed at the source application.

Example 5. The method of any one of the preceding Examples, wherein querying the service at the source application includes querying a mapping storage at the source application that defines mappings between metadata entities and sections of programming interfaces.

Example 6. The method of any one of the preceding Examples, further comprising:
  providing a mapping storage including mappings between a programming interface and one or more metadata entities defined at a metadata model of a metadata exposure service; and
  in response to receiving the query for metadata at the metadata exposure service, providing the metadata for the relevant entities in response to the query to the data warehouse application,
  wherein the service that is queried at the source application in response to the obtained metadata executed the query based on evaluating the mappings stored at the mapping storage.

Example 7. The method of Example 6, wherein the data warehouse application accumulates metadata for entities from a set of source applications based on a common metadata exposure service that defines a structure of metadata entities, and wherein the data warehouse application generates a set of configurations synchronized for acquiring data from the set of source applications to configure automatic execution of data gathering at the data warehouse application.

Automatic Configuration of Data Invocation from One or More Sources Based on Metadata Mappings Example 1. A computer implemented method for configuring automatic invocation of data from one database to another database, the method comprising:
  receiving, at a database associated with a data warehouse application, a request to generate a configuration to acquire data objects based on executing calls to corresponding programming interfaces provided by a source application, wherein the programming interfaces are identified in the received instructions and are associated with acquiring the data objects associated with metadata entities defined at the database;
  in response to the received instructions, configuring the database to automatically execute one or more calls to acquire relevant data for a metadata entity defined at the database, wherein the metadata entity is associated with a section of a first programming interface; and
  invoking the first programming interface at the source application, wherein invoking the first programming interface results in acquiring the relevant data.

Example 2. The method of Example 1, further comprising:
  in response to obtaining identifiers defined for metadata entities, querying, by a data warehouse application, a service at the source application to identify a set of programming interfaces associated with the metadata entities for acquiring data objects corresponding to the obtained metadata; and wherein the instructions received at the database are generated at the data warehouse application based on querying the service to identify the set of programming interfaces.

Example 3. The method of Example 1 or Example 2, wherein the programming interfaces identified as corresponding to the data objects based on the received request are determined based on predetermined mapping logic between programming interfaces and metadata entities at the source application.

Example 4. The method of any one of the preceding Examples, wherein the data warehouse application is a data warehouse cloud platform that accumulates metadata for entities from a set of source applications based on a common metadata exposure service that defines a structure of metadata entities.

Example 5. The method of any one of the preceding Examples, wherein the database of the data warehouse application is configured to automatically acquire data from a set of source application based on deployed data models at the database, wherein the deployed data models are based on metadata and mappings between the metadata and corresponding programing interfaces at the set of source application.

Example 6. The method of any one of the preceding Examples, further comprising:
deploying a metadata model based on acquired metadata and mappings between entities defined at the metadata and corresponding programming interfaces at one or more source applications including the source application.

Example 7. The method of any one of the preceding Examples, wherein the acquired data includes data for data objects associated with the metadata entity and with other metadata entities identified as associated to the metadata entity based on invoking a scope function defining dependencies between entities at the source application.

Example 8. The method of any one of the preceding Examples, wherein the programming interfaces are application programming interfaces.

What is claimed is:

1. A computer-implemented method for exchanging metadata between applications, the method comprising:
providing a metadata service defining a service metadata model for exposing metadata of data objects defined at one or more applications;
in response to receiving a request for importing metadata from a first application of the one or more applications to a separate application, establishing, by the metadata service, a connection to a data source associated with the first application to acquire the metadata from the data source for one or more data objects related to the first application;
in response to establishing the connection, providing, through the metadata service, a view of content from the data source, wherein the view includes a list of entities from the service metadata model associated with the one or more data objects of the first application, wherein for each entity of the list of entities, the service metadata model implements a scope function to determine related entities to a respective type of each entity from the list;
receiving a query defined based on selecting entities from the list of entities provided at the view of the content from the data source to acquire metadata associated with a set of entities including entities related to selected entities from the list of entities included in the view; and
in response to evaluating the received query at a backend of the first application, providing metadata for the set of entities from the data source to the separate application, wherein providing the metadata comprises:
invoking, for each entity of the selected entities, the respective scope function defined at the metadata service, to identify entities related to the selected entities, wherein the provided metadata includes metadata for the related entities and metadata for the selected entities.

2. The method of claim 1, wherein in response to receiving the query, one or more identifiers for the entities are identified and provided to the backend of the first application to query the data at the data source.

3. The method of claim 1, wherein the one or more applications store metadata related to corresponding sets of data objects, wherein metadata related to different sets of data objects is stored according to different metadata models.

4. The method of claim 1, wherein the method further comprises:
transforming metadata of the data objects from the one or more applications into metadata that is in a predefined notation for representation of metadata according to the service metadata model predefined by the metadata service.

5. The method of claim 1, wherein the service metadata model is defined in JSON format.

6. A non-transitory, computer-readable medium coupled to one or more processors and having instructions stored thereon which, when executed by the one or more processors, cause the one or more processors to perform operations, the operations comprising:
providing a metadata service defining a service metadata model for exposing metadata of data objects defined at one or more applications;
in response to receiving a request for importing metadata from a first application of the one or more applications to a separate application, establishing, by the metadata service, a connection to a data source associated with the first application to acquire the metadata from the data source for one or more data objects related to the first application;
in response to establishing the connection, providing, through the metadata service, a view of content from the data source, wherein the view includes a list of entities from the service metadata model associated with the one or more data objects of the first application, wherein for each entity of the list of entities, the service metadata model implements a scope function to determine related entities to a respective type of each entity from the list;
receiving a query defined based on selecting entities from the list of entities provided at the view of the content from the data source to acquire metadata associated with a set of entities including entities related to selected entities from the list of entities included in the view; and
in response to evaluating the received query at a backend of the first application, providing metadata for the set of entities from the data source to the separate application, wherein providing the metadata comprises:
invoking, for each entity of the selected entities, the respective scope function defined at the metadata service, to identify entities related to the selected entities, wherein the provided metadata includes metadata for the related entities and metadata for the selected entities.

7. The computer-readable medium of claim 6, wherein in response to receiving the query, one or more identifiers for the entities are identified and provided to the backend of the first application to query the data at the data source.

8. The computer-readable medium of claim 6, wherein the one or more applications store metadata related to corresponding sets of data objects, wherein metadata related to different sets of data objects is stored according to different metadata models.

9. The computer-readable medium of claim 6, further storing instructions, which when executed by the one or more processors, cause the one or more processors to perform operations comprising:
transforming metadata of the data objects from the one or more applications into metadata that is in a predefined notation for representation of metadata according to the service metadata model predefined by the metadata service.

10. The computer-readable medium of claim 6, wherein the service metadata model is defined in JSON format.

11. A system comprising
a computing device; and
a computer-readable storage device coupled to the computing device and having instructions stored thereon which, when executed by one or more processors of the computing device, cause the computing device to perform operations, the operations comprising:
providing a metadata service defining a service metadata model for exposing metadata of data objects defined at one or more applications;
in response to receiving a request for importing metadata from a first application of the one or more applications to a separate application, establishing, by the metadata service, a connection to a data source associated with the first application to acquire the metadata from the data source for one or more data objects related to the first application;
in response to establishing the connection, providing, through the metadata service, a view of content from the data source, wherein the view includes a list of entities from the service metadata model associated with the one or more data objects of the first application, wherein for each entity of the list of entities, the service metadata model implements a scope function to determine related entities to a respective type of each entity from the list;
receiving a query defined based on selecting entities from the list of entities provided at the view of the content from the data source to acquire metadata associated with a set of entities including entities related to selected entities from the list of entities included in the view; and
in response to evaluating the received query at a backend of the first application, providing metadata for the set of entities from the data source to the separate application, wherein providing the metadata comprises:
invoking, for each entity of the selected entities, the respective scope function defined at the metadata service, to identify entities related to the selected entities, wherein the provided metadata includes metadata for the related entities and metadata for the selected entities.

12. The system of claim 11, wherein in response to receiving the query, one or more identifiers for the entities are identified and provided to the backend of the first application to query the data at the data source.

13. The system of claim 11, wherein the one or more applications store metadata related to corresponding sets of data objects, wherein metadata related to different sets of data objects is stored according to different metadata models.

14. The system of claim 11, wherein the computer-readable storage device stores further instructions which, when executed by the one or more processors of the computing device, cause the computing device to perform operations, the operations comprising:
transforming metadata of the data objects from the one or more applications into metadata that is in a predefined notation for representation of metadata according to the service metadata model predefined by the metadata service.

* * * * *